US012710639B2

(12) United States Patent
Ikeda et al.

(10) Patent No.: US 12,710,639 B2
(45) Date of Patent: Aug. 18, 2026

(54) WAVELENGTH CONVERSION DEVICE, PHOSPHOR WHEEL, LIGHT SOURCE DEVICE, PROJECTION DISPLAY APPARATUS, AND METHOD FOR MANUFACTURING WAVELENGTH CONVERSION DEVICE

(71) Applicant: Panasonic Intellectual Property Management Co., Ltd., Osaka (JP)

(72) Inventors: Takashi Ikeda, Osaka (JP); Yusaku Nishikawa, Osaka (JP); Yoshiki Tanaka, Kyoto (JP)

(73) Assignee: PANASONIC PROJECTOR & DISPLAY CORPORATION, Osaka (JP)

(*) Notice: Subject to any disclaimer, the term of this patent is extended or adjusted under 35 U.S.C. 154(b) by 356 days.

(21) Appl. No.: 18/242,639

(22) Filed: Sep. 6, 2023

(65) Prior Publication Data

US 2023/0418047 A1 Dec. 28, 2023

Related U.S. Application Data

(63) Continuation of application No. PCT/JP2022/006828, filed on Feb. 21, 2022.

(30) Foreign Application Priority Data

Mar. 8, 2021 (JP) ................................ 2021-036218

(51) Int. Cl.
*G02B 26/00* (2006.01)
*G03B 21/20* (2006.01)

(52) U.S. Cl.
CPC ......... *G02B 26/008* (2013.01); *G03B 21/204* (2013.01)

(58) Field of Classification Search
CPC .... G02B 26/008; G03B 21/204; G03B 21/00; G03B 21/14; G03B 33/08; H04N 5/74; H04N 9/31
(Continued)

(56) References Cited

U.S. PATENT DOCUMENTS

2011/0149549 A1 6/2011 Miyake
2014/0104583 A1 4/2014 Osaka
(Continued)

FOREIGN PATENT DOCUMENTS

JP 2004-71357 3/2004
JP 2006-295584 10/2006
(Continued)

OTHER PUBLICATIONS

International Search Report issued Mar. 29, 2022 in International (PCT) Application No. PCT/JP2022/006828.
(Continued)

*Primary Examiner* — Magda Cruz
(74) *Attorney, Agent, or Firm* — Wenderoth, Lind & Ponack, L.L.P.

(57) ABSTRACT

The wavelength conversion device includes a wavelength conversion element that generates, from incident first light, second light having a wavelength different from a wavelength of the first light and third light having a wavelength different from the wavelength of the first light and the wavelength of the second light. The wavelength conversion element includes a plurality of wavelength converters arranged adjacent to each other in a first direction. Each of the plurality of wavelength converters includes a first phosphor layer that converts the first light into fluorescent light that is the second light, and a second phosphor layer that converts the first light into fluorescent light that is the third light. The first phosphor layer and the second phosphor layer
(Continued)

are arranged adjacent to each other to cause the plurality of first phosphor layers and the plurality of second phosphor layers to be alternately arranged in the first direction.

18 Claims, 19 Drawing Sheets

(58) Field of Classification Search
USPC ........................................................ 353/84
See application file for complete search history.

(56) References Cited

U.S. PATENT DOCUMENTS

2014/0118991 A1* 5/2014 Lin ..................... G03B 21/204 362/324
2015/0103511 A1* 4/2015 Miyashita ................ F21K 9/64 29/428
2017/0237953 A1* 8/2017 Akiyama ............ H04N 9/3182 353/31
2019/0187543 A1 6/2019 Watanabe
2019/0302593 A1* 10/2019 Kito .................. G03B 21/2066
2019/0331991 A1 10/2019 Ikeda et al.
2020/0363710 A1* 11/2020 Ikeda .................. G03B 21/008

FOREIGN PATENT DOCUMENTS

JP 2011-129406 6/2011
JP 2013-45698 3/2013
JP 2015-76594 4/2015
JP 2016-136184 7/2016
JP 2019-109330 7/2019
JP 2019-194673 11/2019
JP 2020-112757 7/2020
JP 2021092728 A * 6/2021 ............ G03B 21/00
WO 2012/172672 12/2012

OTHER PUBLICATIONS

Office Action issued Mar. 5, 2025 in Japanese Patent Application No. 2021-036218, with English-language Translation.

* cited by examiner (a)
(b)
1
3
5
11
11a
11b
11c
12
12a
19
Wa
DA
DB
III
X
Y
Z

WAVELENGTH CONVERSION DEVICE, PHOSPHOR WHEEL, LIGHT SOURCE DEVICE, PROJECTION DISPLAY APPARATUS, AND METHOD FOR MANUFACTURING WAVELENGTH CONVERSION DEVICE

BACKGROUND

1. Technical Field

The present invention relates to a wavelength conversion device, a phosphor wheel including the wavelength conversion device, a light source device, a projection display apparatus, and a method for manufacturing the wavelength conversion device.

2. Description of the Related Art

Conventionally, there is a projection display apparatus that irradiates a phosphor wheel with light from a light source and generates white light using the light from the light source and the generated light.

For example, the projection display apparatus irradiates the phosphor wheel with blue light emitted from a light source unit to generate yellow light, and synthesizes the generated yellow light and the blue light emitted from the light source unit to generate the white light. The white light is further separated into color light of three primary colors, modulated for each color light, and the modulated color light is synthesized again to generate image light.

For example, Patent Literature (PTL) 1 has devised a wavelength conversion device in which phosphor layers including a plurality of phosphor particles having different particle sizes are laminated.

PTL 1 is Unexamined Japanese Patent Publication No. 2019-194673.

SUMMARY

However, in the technique described in PTL 1, when two types of wavelength conversion layers having different wavelength regions of fluorescent light that are wavelength-converted are laminated on a substrate, light converted by each wavelength conversion layer is converted again by another wavelength conversion layer, and a conversion efficiency decreases. Further, in a case where the two types of wavelength conversion layers are arranged in parallel with a surface of the substrate, a ratio of light irradiated to each wavelength conversion layer changes due to a shift of a spot of the irradiated light.

An object of the present disclosure is to provide a wavelength conversion device, a phosphor wheel, a light source device, a projection display apparatus, and a method for manufacturing the wavelength conversion device that suppress a decrease in conversion efficiency and reduces a change in the ratio of light irradiated to two types of wavelength conversion layers that convert the light into light in different wavelength regions due to a shift of the spot of the irradiated light.

A wavelength conversion device according to the present disclosure includes a wavelength conversion element that generates, from first light incident on the wavelength conversion element, second light having a wavelength different from a wavelength of the first light and third light having a wavelength different from the wavelength of the first light and the wavelength of the second light. The wavelength conversion element includes a plurality of wavelength converters arranged adjacent to each other in a first direction intersecting an incident direction in which the first light is incident. Each of the plurality of wavelength converters includes a first phosphor layer that converts the first light into fluorescent light that is the second light, and a second phosphor layer that converts the first light into fluorescent light that is the third light. The first phosphor layer and the second phosphor layer are arranged adjacent to each other to cause the plurality of first phosphor layers and the plurality of second phosphor layers included in the plurality of wavelength converters to be alternately arranged in the first direction.

Further, the phosphor wheel according to the present disclosure includes the wavelength conversion device described above and a motor that rotationally drives a substrate.

Further, the light source device according to the present disclosure includes the phosphor wheel described above and a light source that emits laser light as the first light. A width of the spot of the first light incident on the wavelength conversion device from the light source in a radial direction is equal to an integral multiple of a width of each of the plurality of wavelength converters in the radial direction.

Further, a projection display apparatus according to the present disclosure includes: the light source device described above; a light modulator that generates image light by using the second light and the third light emitted from the light source device; and a projection optical system that projects the image light.

Further, in the method for manufacturing a wavelength conversion device according to the present disclosure, a plurality of first resin bodies including a first phosphor that converts first light incident on a substrate into fluorescent light that is second light having a wavelength different from a wavelength of the first light are applied onto the substrate to be arranged at intervals in a direction along a surface of the substrate, a plurality of second resin bodies including a second phosphor that converts the first light into fluorescent light that is third light having a wavelength different from a wavelength of the first light and the wavelength of the second light are applied onto the substrate to cause each of the plurality of second resin bodies to be adjacent to each of the plurality of first resin bodies in the direction along the surface of the substrate, and the plurality of first resin bodies and the plurality of second resin bodies applied onto the substrate are fired.

Further, the method for manufacturing a wavelength conversion device according to the present disclosure includes: forming a plurality of first sheets including a first phosphor that converts first light incident on a substrate into fluorescent light that is second light having a wavelength different from a wavelength of the first light; forming a plurality of second sheets including a second phosphor that converts the first light into fluorescent light that is third light having a wavelength different from a wavelength of the first light and the wavelength of the second light; alternately laminating the plurality of first sheets and the plurality of second sheets; winding the plurality of first sheets and the plurality of second sheets that are laminated; and firing the plurality of first sheets and the plurality of second sheets that are wound; slicing the plurality of first sheets and the plurality of second sheets that are fired into a predetermined thickness to form a wavelength conversion element that is spiral; and fixing the wavelength conversion element to the substrate.

The present disclosure can provide a wavelength conversion device, a phosphor wheel, a light source device, a projection display apparatus, and a method for manufacturing the wavelength conversion device that suppress the decrease in conversion efficiency and reduce a change in a ratio of light irradiated to two types of wavelength conversion layers that convert light into light in different wavelength regions due to the shift of the spot of the irradiated light.

BRIEF DESCRIPTION OF THE DRAWINGS

FIG. 3 is a cross-sectional view taken along a line III-III in part (a) of FIG. 1.

FIG. 4 is a flowchart illustrating a flow of manufacturing a wavelength conversion device using a printing method.

DETAILED DESCRIPTION

Hereinafter, exemplary embodiments will be described in detail with appropriate reference to the drawings. However, descriptions more in detail than necessary may be omitted. For example, the detailed descriptions of already well-known matters and overlap descriptions of substantially the same configurations may be omitted. This is to avoid unnecessarily redundant descriptions below and to facilitate understanding of those skilled in the art.

Note that, the accompanying drawings and the descriptions below are provided to enable those skilled in the art to fully understand the present disclosure, and are not intended to limit subject matters described in the claims.

First Exemplary Embodiment

[1-1. Configurations of Wavelength Conversion Device and Phosphor Wheel]

Figure 1:
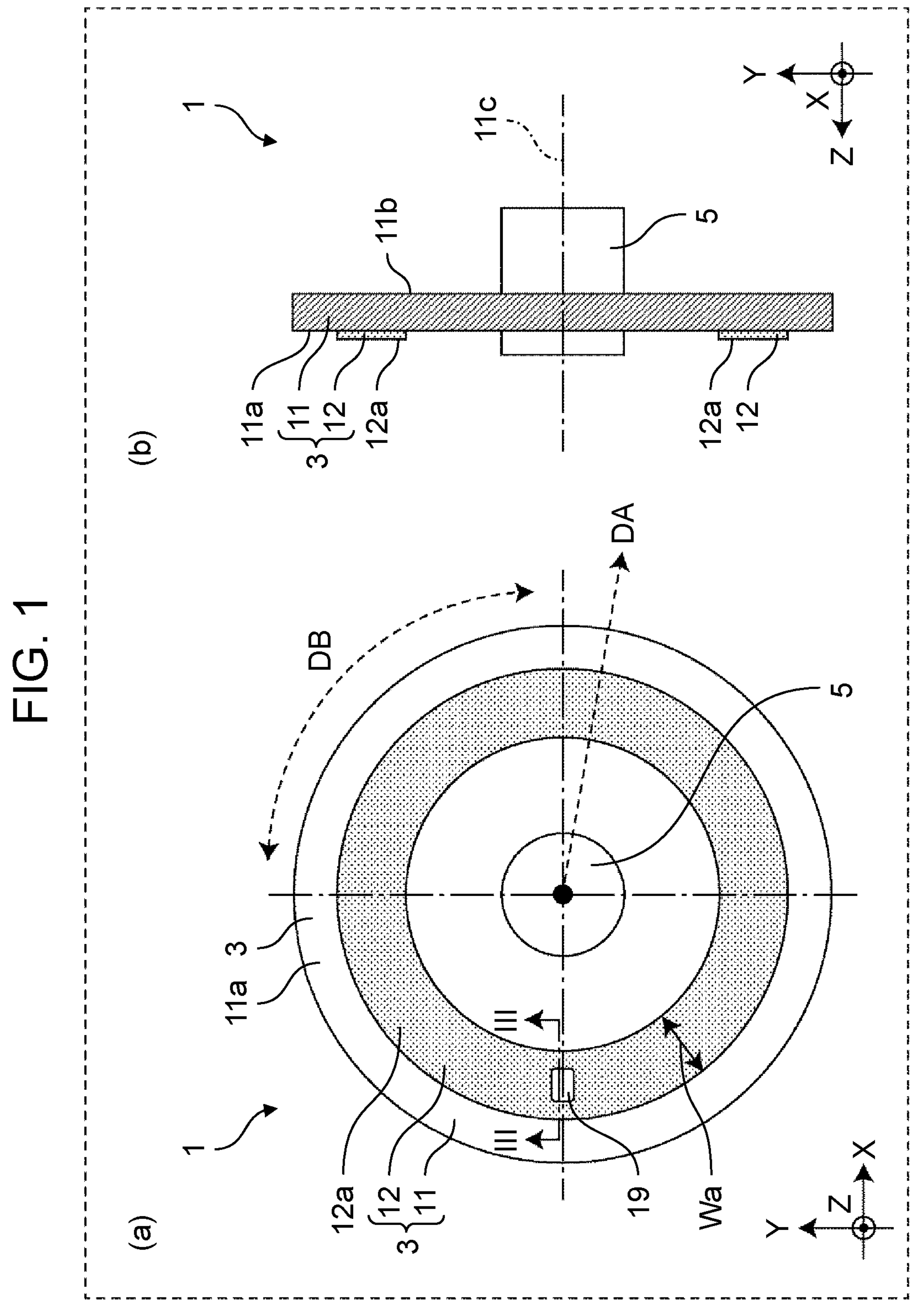
FIG. 1 is a schematic view illustrating a configuration example of a phosphor wheel according to a first exemplary embodiment, in which part (a) of FIG. 1 is a view of phosphor wheel 1 as viewed from a front in a light incident direction, and part (b) of FIG. 1 is a view of part (a) of FIG. 1 as viewed from a side surface.
Figure 2:
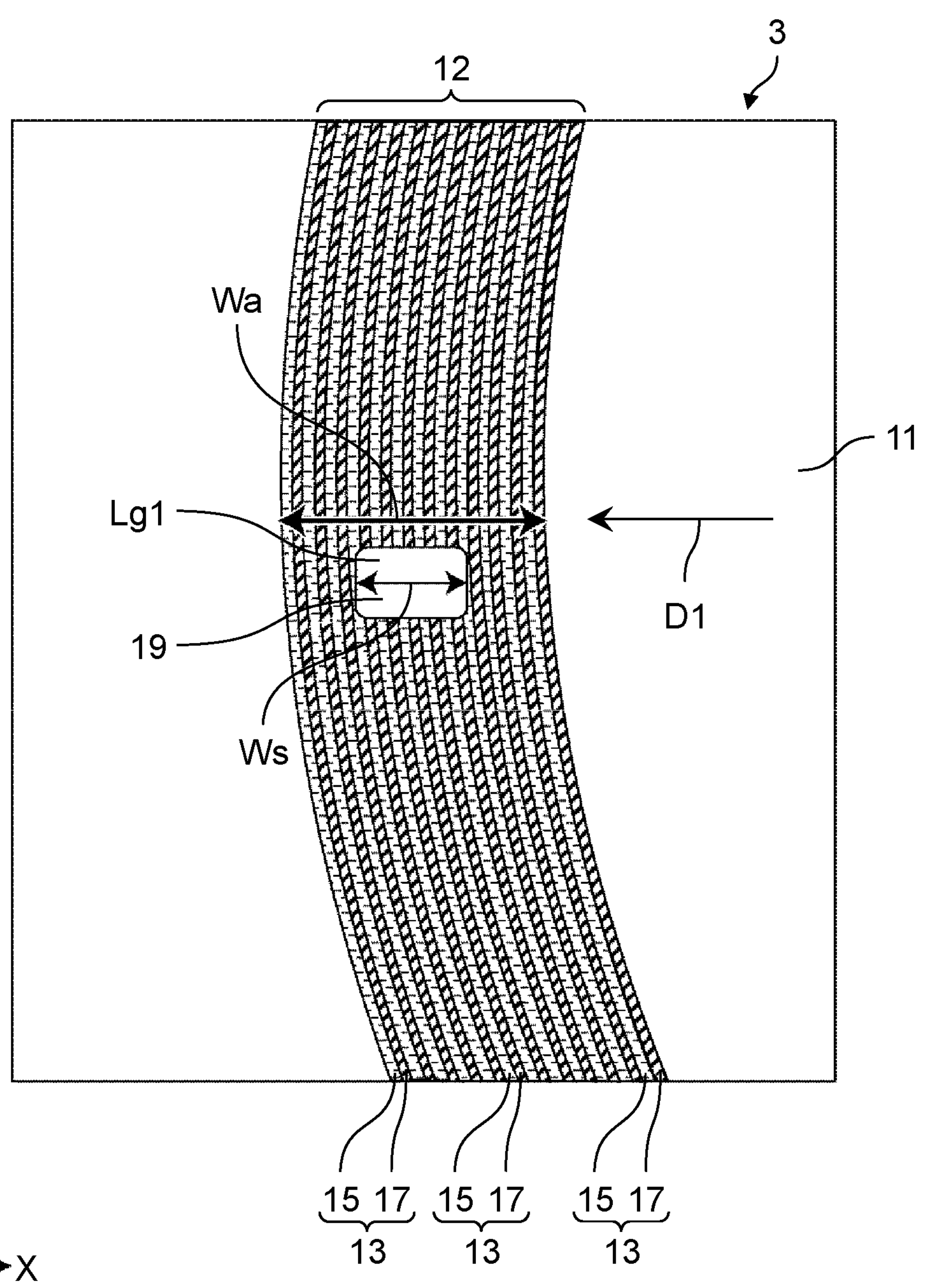
FIG. 2 is a partially enlarged view of the phosphor wheel of part (a) of FIG. 1.
Figures 3, 4:
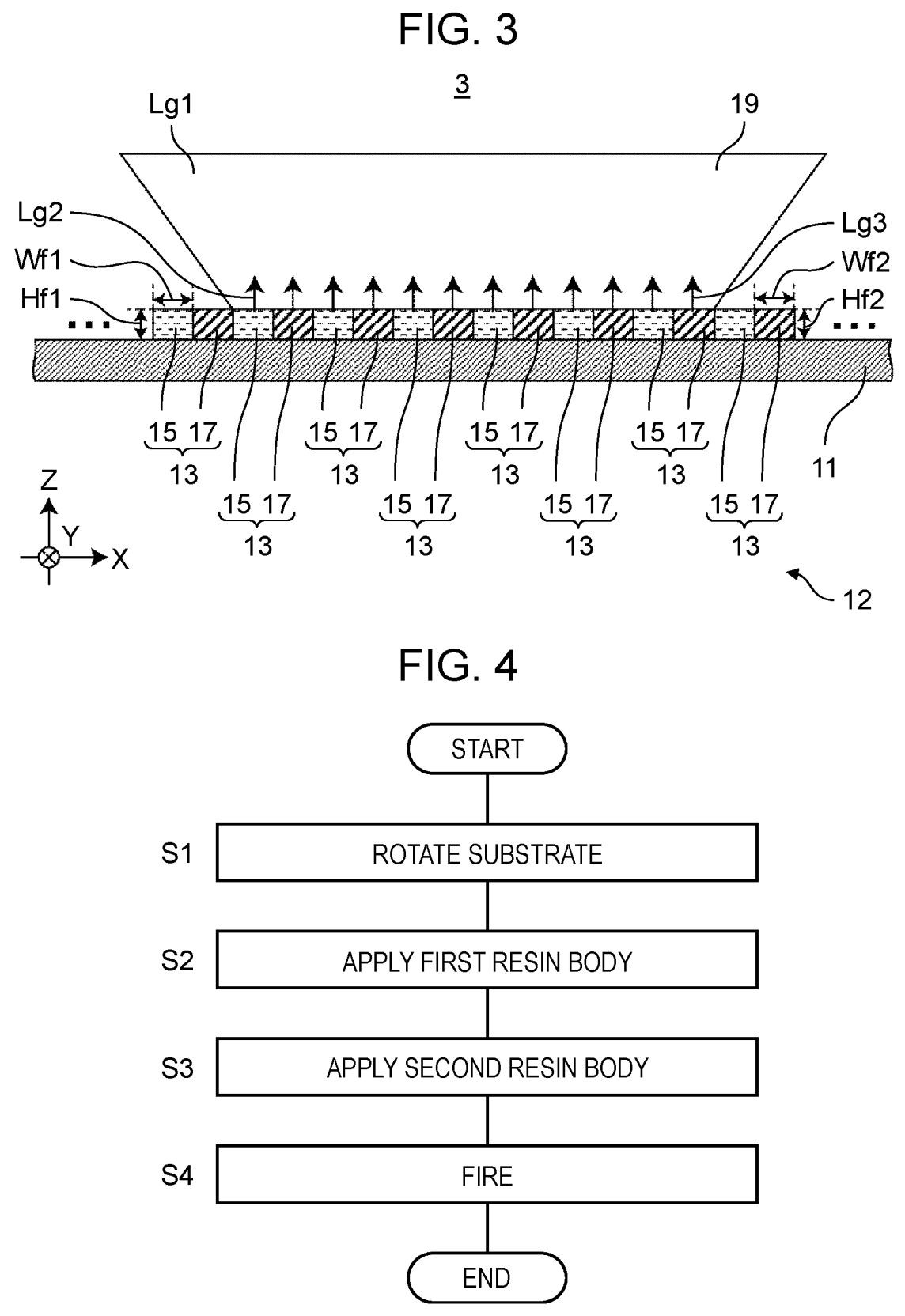

The wavelength conversion device and the phosphor wheel according to the first exemplary embodiment will be described below with reference to FIGS. 1 to 3. In the first exemplary embodiment, for example, the wavelength conversion device and the phosphor wheel used in the projection display apparatus will be described. FIG. 1 is the schematic view illustrating the configuration example of phosphor wheel 1, in which part (a) of FIG. 1 is a view of phosphor wheel 1 as viewed from a front in a light incident direction, and part (b) of FIG. 1 is a view of part (a) of FIG. 1 as viewed from a side surface. FIG. 2 is a partially enlarged view of the phosphor wheel of FIG. 1. FIG. 3 is a cross-sectional view taken along a line III-III in part (a) of FIG. 1. Note that, in each drawing, a plane on which phosphor wheel 1 receives illumination light is defined as an XY plane, and a direction orthogonal to the XY plane is defined as a Z direction. Further, a Y direction is defined as a vertical direction. Further, the radial direction of substrate 11 is denoted by DA, and a circumferential direction of substrate 11 is denoted by DB.

Phosphor wheel 1 includes wavelength conversion device 3 and motor 5 that rotationally drives wavelength conversion device 3. Wavelength conversion device 3 includes substrate 11 and wavelength conversion element 12. Phosphor wheel 1 according to the first exemplary embodiment is a so-called phosphor wheel for a projection apparatus device.

Substrate 11 is made of, for example, aluminum, and has first main surface 11*a* and second main surface 11*b*. Substrate 11 has, for example, a disk shape that can be controlled to rotate with respect to central axis 11*c* of substrate 11. Wavelength conversion element 12 is laminated on first main surface 11*a* of substrate 11. For example, motor 5 is attached to second main surface 11*b* of substrate 11.

Wavelength conversion element 12 generates second light Lg2 having a wavelength different from incident first light Lg1, and third light Lg3 having a wavelength different from the wavelength of first light Lg1 and the wavelength of second light Lg2. Exposed surface 12*a* side of wavelength conversion element 12 arranged on first main surface 11*a* of substrate 11 is irradiated with blue first light Lg1. Wavelength conversion element 12 includes a plurality of wavelength converters 13 arranged adjacent to each other in first direction D1 (see FIG. 2) intersecting the direction in which first light Lg1 is incident. First direction D1 intersecting the direction in which first light Lg1 is incident is, for example, a direction along first main surface 11*a* of substrate 11. Here, the incident direction in which first light Lg1 is incident on wavelength conversion element 12 is a Z-axis direction (see FIG. 1).

Each of the plurality of wavelength converters 13 includes first phosphor layer 15 that wavelength-converts incident first light Lg1 into fluorescent light of second light Lg2, and second phosphor layer 17 that wavelength-converts first light Lg1 into fluorescent light of third light Lg3. First phosphor layer 15 and second phosphor layer 17 are disposed adjacent to each other so as to be alternately arranged in first direction D1, for example, in the direction along first main surface 11*a* of substrate 11. In other words, as shown in FIG. 2, the plurality of first phosphor layers 15 and the plurality of second phosphor layers 17 are arranged adjacent to each other so as to be alternately arranged in first direction D1. In this manner, each of wavelength converters 13 includes a pair of first phosphor layer 15 and second phosphor layer 17. For example, from 12 to 17 inclusive wavelength converters 13 are arranged on substrate 11. In this manner, wavelength conversion element 12 includes, for example, 12 or more wavelength converters 13.

In a case where substrate 11 has the disk shape, the plurality of wavelength converters 13 are disposed adjacent to each other in the radial direction of substrate 11, and first phosphor layer 15 and second phosphor layer 17 are disposed adjacent to each other in the radial direction of substrate 11.

Width Wf1 of first phosphor layer 15 and width Wf2 of second phosphor layer 17 have the same length. Here, the same length may be not only the completely same length but also substantially the same length including an error of about ±10%, for example.

Width Wf1 of first phosphor layer 15 in the radial direction is longer than height Hf1 of first phosphor layer 15 in a direction in which first light Lg1 is incident, for example, a direction perpendicular to first main surface 11*a* of substrate 11. Width Wf2 of second phosphor layer 17 in the radial direction is longer than height Hf2 of second phosphor layer 17 in the direction in which first light Lg1 is incident, for example, the direction perpendicular to first main surface 11*a* of substrate 11. Accordingly, this makes it possible to reduce wavelength conversion of second light Lg2 generated in first phosphor layer 15 into fluorescent light again in adjacent second phosphor layer 17. Further, it is possible to reduce wavelength conversion of third light Lg3 generated in second phosphor layer 17 into fluorescent light again in adjacent first phosphor layer 15.

First phosphor layer 15 and second phosphor layer 17 are formed using, for example, a resin such as silicone or an inorganic substance such as alumina as a binder. Each of first phosphor layer 15 and second phosphor layer 17 contains the plurality of phosphor particles.

The phosphor particles of first phosphor layer 15 emit second light Lg2 in a wavelength range longer than a wavelength range of irradiated first light Lg1 and a wavelength range of third light Lg3 fluorescent by second phosphor layer 17. The phosphor particles of first phosphor layer 15 are, for example, Ce-activated YAG-based yellow phosphors that are excited by irradiated blue color light and emit the yellow light containing wavelength components of green light and red light. A typical chemical composition of a crystalline matrix of these phosphor particles is $Y_3Al_5O_{12}$. Further, the phosphor particles of first phosphor layer 15 may be phosphor that emits the red light instead of phosphor that emits the yellow light. As the phosphor that emits the red light, for example, an α-sialon phosphor ($Si_{12-(m+n)}AL_{(m+n)}O_nN_{16-n}$) may be used.

The phosphor particles of the second phosphor layer emit second light Lg2 in the wavelength range longer than the wavelength range of first light Lg1 emitted and shorter than the wavelength range of second light Lg2 fluorescent by first phosphor layer 15. The phosphor particles of second phosphor layer 17 are, for example, phosphors that are excited by the irradiated blue color light and emit green light containing the wavelength component of the green light. As the phosphor that emits the green light, for example, LuAG ($Lu_3Al_5O_{12}$) may be used. First phosphor layer 15 and second phosphor layer 17 are formed in an annular shape when viewed from the front in the light incident direction of substrate 11.

Width Ws of spot 19 by first light Lg1 in the direction intersecting the plurality of wavelength converters 13 is about 1 mm to 3 mm. Width Ws of spot 19 is adjusted in accordance with a size of an illumination system of the projection display apparatus or a panel of the light modulator.

Width Wa of wavelength conversion element 12, which is a total width of the plurality of wavelength converters 13, is larger than width Ws of spot 19 and is about twice or more. In the first exemplary embodiment, width Wa of wavelength conversion element 12 is a sum of widths of the plurality of wavelength converters 13 in the radial direction. Width Ws of spot 19 of first light Lg1 incident on wavelength conversion device 3 from the light source in radial direction DA is equal to, for example, an integral multiple of the length (width) of wavelength converters 13 in radial direction DA. In a case where width Ws of spot 19 is equal to the integral multiple of the length (width) of wavelength converters 13 in radial direction DA, respective ratios of spots 19 with which first phosphor layer 15 and second phosphor layer 17 are irradiated are substantially equal.

A reflection layer that reflects second light Lg2 and third light Lg3 generated in first phosphor layer 15 and second phosphor layer 17, respectively, may be disposed between substrate 11 and wavelength conversion element 12. Accordingly, second light Lg2 and third light Lg3 traveling toward substrate 11 by first phosphor layer 15 and second phosphor layer 17 can be caused to travel toward exposed surface 12*a* of wavelength conversion element 12, such that the conversion efficiency to fluorescent light can be improved. Further, by reflecting the remaining light of Lg1 that has not been absorbed by wavelength conversion element 12 on a reflection surface and causing the remaining light to be incident on wavelength conversion element 12 again, light Lg1 that is wavelength-converted can be increased, and the conversion efficiency to fluorescent light can be improved.

[1-2. Method for Manufacturing Wavelength Conversion Device]

Figure 5:
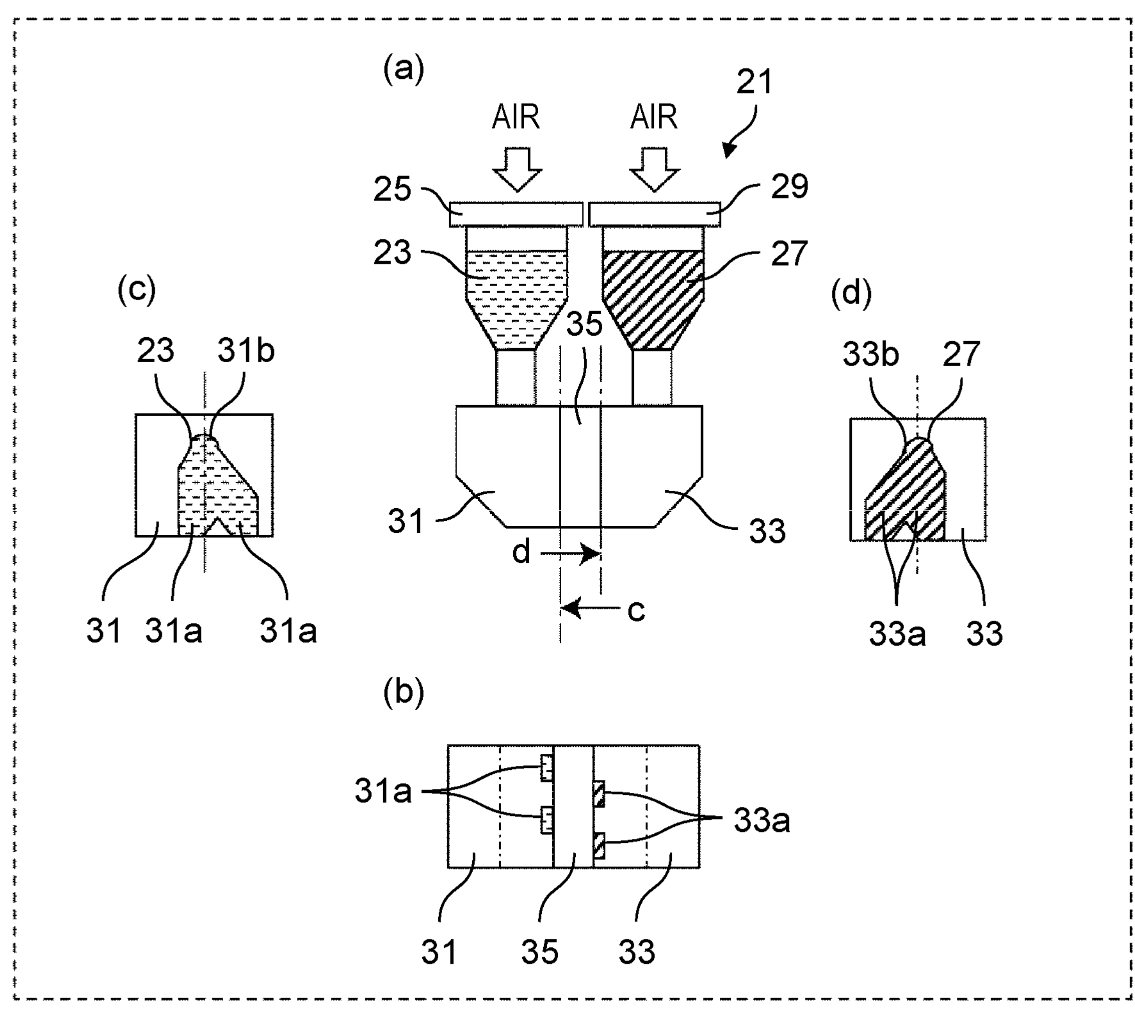
FIG. 5 is a configuration diagram illustrating an applicator for applying a phosphor layer to the substrate, in which part (a) of FIG. 5 is an overall external view, part (b) of FIG. 5 is a bottom view of applicator 21, part (c) of FIG. 5 is a cross-sectional view of a nozzle of part (a) of FIG. 5 taken along arrow c, and part (d) of FIG. 5 is a cross-sectional view of a pressing plate of part (a) of FIG. 5 taken along arrow d.

Next, the method for manufacturing wavelength conversion device 3 will be described with reference to FIG. 4. FIG. 4 is a flowchart illustrating a flow of manufacturing wavelength conversion device 3 using a coating method. FIG. 5 is a configuration diagram illustrating applicator 21 for applying a phosphor layer to substrate 11, in which part (a) of FIG. 5 is an overall external view, part (b) of FIG. 5 is a bottom view of applicator 21, part (c) of FIG. 5 is a cross-sectional view of the nozzle of part (a) of FIG. 5 taken along arrow c, and part (d) of FIG. 5 is a cross-sectional view of the pressing plate of part (a) of FIG. 5 taken along arrow d.

Wavelength conversion element 12 is formed by being applied onto substrate 11 using a dedicated applicator 21. Applicator 21 includes, for example, first syringe 25 that accommodates first resin body 23 containing the phosphor particles of first phosphor layer 15 using silicone as the binder, and second syringe 29 that accommodates second resin body 27 containing the phosphor particles of second phosphor layer 17 using silicone as the binder. Applicator 21 further includes first nozzle 31 that discharges first resin body 23 of first syringe 25, second nozzle 33 that discharges second resin body 27 of second syringe 29, and pressing plate 35 disposed between first nozzle 31 and second nozzle 33.

First nozzle 31 has two discharge ports 31*a* disposed at a lower end and communication hole 31*b* communicating from first syringe 25 to each of discharge ports 31*a*. Second nozzle 33 has two discharge ports 33*a* disposed at the lower end and communication hole 33*b* communicating from second syringe 29 to each of discharge ports 33*a*.

When air is applied to first syringe 25, first resin body 23 is discharged from first syringe 25 through communication hole 31*b* of first nozzle 31 from the two discharge ports 31*a*. When air is applied to second syringe 29, second resin body 27 is discharged from second syringe 29 through communication hole 33*b* of second nozzle 33 from the two discharge ports 33*a*.

Figure 6:
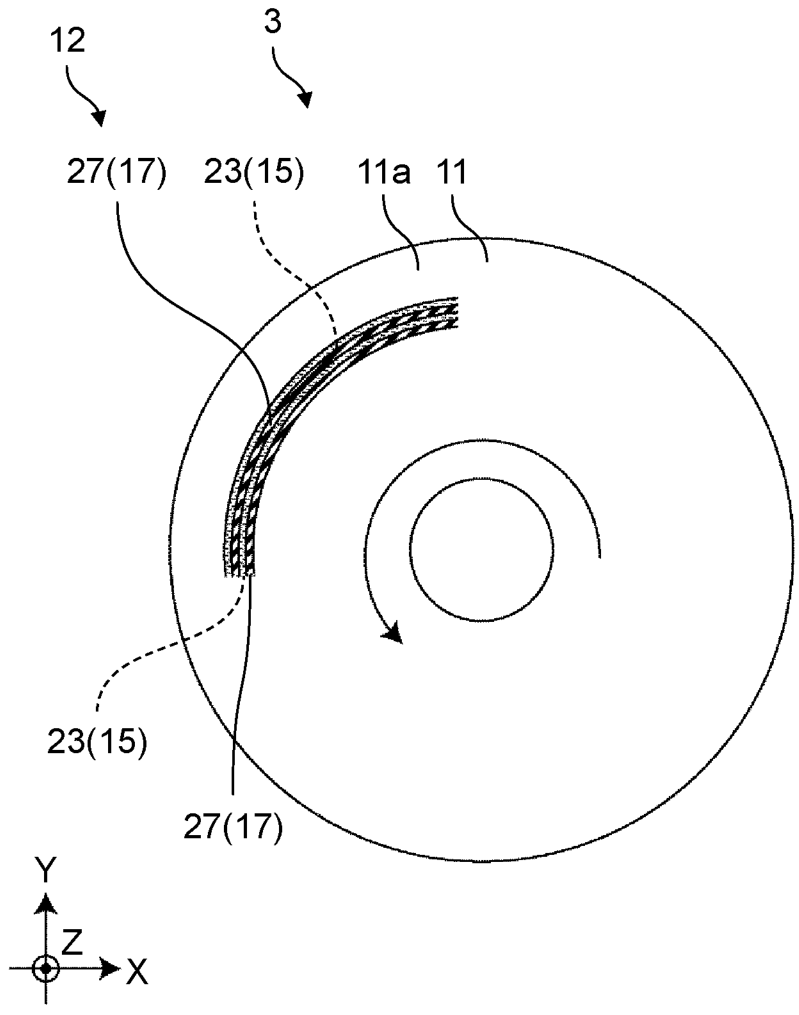
FIG. 6 is a conceptual diagram illustrating a manufacturing process of the wavelength conversion device.

In step S1, as illustrated in FIG. 6, substrate 11 is rotated. In step S2, as illustrated in FIG. 5, air is applied to first syringe 25 to apply first resin body 23 onto rotating substrate 11 from discharge ports 31*a*. Since the two discharge ports 31*a* are formed in first nozzle 31, as illustrated in FIG. 6, two layers of first resin body 23 are formed along a rotation direction of substrate 11. In other words, two first resin bodies 23 are applied onto substrate 11 so as to be arranged at intervals in the direction along first main surface 11*a* of substrate 11.

In step S3, air is applied to second syringe 29 to apply second resin body 27 from discharge port 33*a* onto rotating substrate 11. Since the two discharge ports 33*a* are formed in second nozzle 33, two layers of second resin body 27 are formed along the rotation direction of substrate 11. In other words, the two second resin bodies 27 are applied onto substrate 11 so as to be adjacent to the two first resin bodies 23 in the direction along first main surface 11*a* of substrate 11.

Steps S2 and S3 may be performed simultaneously, or either one may be performed first to sequentially form the layer of first resin body 23 and the layer of second resin body 27. By repeating these steps S2 and S3, a desired number of layers of first resin body 23 and layers of second resin body 27 are formed on substrate 11.

In step S4, by firing the layer of first resin body 23 and the layer of second resin body 27 formed on substrate 11, the layer of first resin body 23 becomes first phosphor layer 15, and the layer of second resin body 27 becomes second phosphor layer 17. In this manner, wavelength conversion element 12 can be formed. Note that, in the present exemplary embodiment, an example has been described in which the number of layers of each of first phosphor layer 15 and second phosphor layer 17 that is applied is two at a time, but a total number of layers applied at a time is not limited to two, and it is possible to form more phosphor layers at a time by increasing the number of openings of first nozzle 31 and second nozzle 33.

[1-3. Effects and Others]

As described above, in the first exemplary embodiment, wavelength conversion device 3 includes the plurality of wavelength converters 13 arranged adjacent to each other in the first direction intersecting the direction in which first light Lg1 is incident. Each of the plurality of wavelength converters 13 includes first phosphor layer 15 that performs wavelength conversion into fluorescent light of second light Lg2 having a wavelength different from the wavelength of the incident first light Lg1, and second phosphor layer 17 that is disposed adjacent to first phosphor layer 15 in the first direction and performs wavelength conversion into fluorescent light of third light Lg3 having a wavelength different from the wavelength of first light Lg1 and the wavelength of second light Lg2. First phosphor layer 15 and second phosphor layer 17 are arranged adjacent to each other so as to be alternately arranged in the first direction.

Since second light Lg2 emitted from first phosphor layer 15 is incident on and absorbed by second phosphor layer 17, second light Lg2 is reduced, and third light Lg3 emitted from second phosphor layer 17 is incident on and absorbed by first phosphor layer 15, such that second light Lg2 can be prevented from being reduced.

Figures 7, 8:
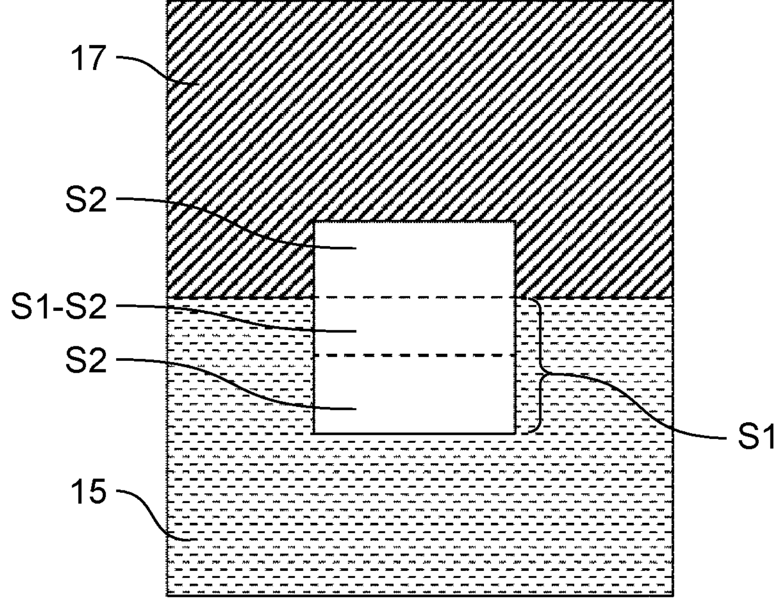
FIG. 7 is a first explanatory diagram illustrating a spot of first light evenly irradiated to each phosphor layer of the wavelength converters.
FIG. 8 is a second explanatory diagram illustrating the spot of the first light biased and irradiated to any one of the phosphor layers of the wavelength converters.

In this manner, the color mixing ratio between second light Lg2 and third light Lg3 can be reduced. Here, the color mixing ratio will be described with reference to FIGS. 7 and 8. FIG. 7 is an explanatory diagram illustrating a position of spot 19 when first light Lg1 is uniformly applied to first phosphor layer 15 and second phosphor layer 17. FIG. 8 is an explanatory diagram illustrating the position of spot 19 when a region of spot 19 irradiated with first light Lg1 is biased to first phosphor layer 15. Note that, for easy understanding, a case where first light Lg1 is applied across the pair of first phosphor layer 15 and second phosphor layer 17 will be described as an example.

Area Ss of the region of spot 19 irradiated with first light Lg1 is a sum of region S1 irradiated on first phosphor layer 15 and region S2 irradiated on second phosphor layer 17. In a case where first light Lg1 is uniformly applied to first phosphor layer 15 and second phosphor layer 17, an area of region S1 and an area of region S2 are equal to each other (S1=S2), such that the following Formula (1) is established.

$$S1/Ss = S2/Ss = 0.5(50\%), \quad \text{Formula (1)}$$

Next, when an optical path of first light Lg1 is slightly shifted and wavelength converters 13 are irradiated with first light Lg1, as illustrated in FIG. 8, first phosphor layer and second phosphor layer 17 are not uniformly irradiated. FIG. 8 illustrates, for example, a case where spot 19 is shifted toward first phosphor layer 15.

$$(S1/Ss - S2/Ss)/2/0.5 = (S1 - S2)/Ss, \quad \text{Formula (2)}$$

$$(S2/Ss - S1/Ss)/2/0.5 = (S2 - S1)/Ss, \quad \text{Formula (3)}$$

In a case where S1≥S2, the color mixing ratio is calculated by Formula (2), and in a case where S1<S2, the color mixing ratio is calculated by Formula (3).

When a maximum value of the color mixing ratio is low in consideration of a shift of the optical path, it indicates that an influence of the shift of the optical path of first light Lg1 is hardly received. In the following descriptions, a maximum of the color mixing ratio in consideration of the shift of the optical path is described as the maximum color mixing ratio. The maximum color mixing ratio in wavelength conversion device 3 of the first exemplary embodiment tends to decrease as the number of wavelength converters 13 increases, and to increase again after a certain number of the wavelength converters. This is because, if width Wa of wavelength conversion element 12 is constant, the width of each of first phosphor layer 15 and second phosphor layer 17 decreases as the number of wavelength converters 13 increases.

The smaller the width of each of first phosphor layer 15 and second phosphor layer 17 is, the more the influence of the shift of spot 19 can be reduced. However, when the number of wavelength converters 13 is too large and the widths of first phosphor layer 15 and second phosphor layer 17 are too small, a frequency at which second light Lg2 emitted from first phosphor layer 15 enters adjacent second phosphor layer 17 without being emitted from an upper surface of first phosphor layer 15 and is wavelength-converted into the fluorescent light of third light Lg3 increases. Accordingly, a hue of light emitted from wavelength conversion device 3 changes.

According to the first exemplary embodiment, when the number of wavelength converters 13, that is, the number of divisions with respect to width Wa of wavelength conversion element 12 is 12 to 17, the maximum color mixing ratio is less than or equal to 15%, and it is possible to reduce the maximum color mixing ratio to such an extent that human eyes do not notice it.

Figure 9:
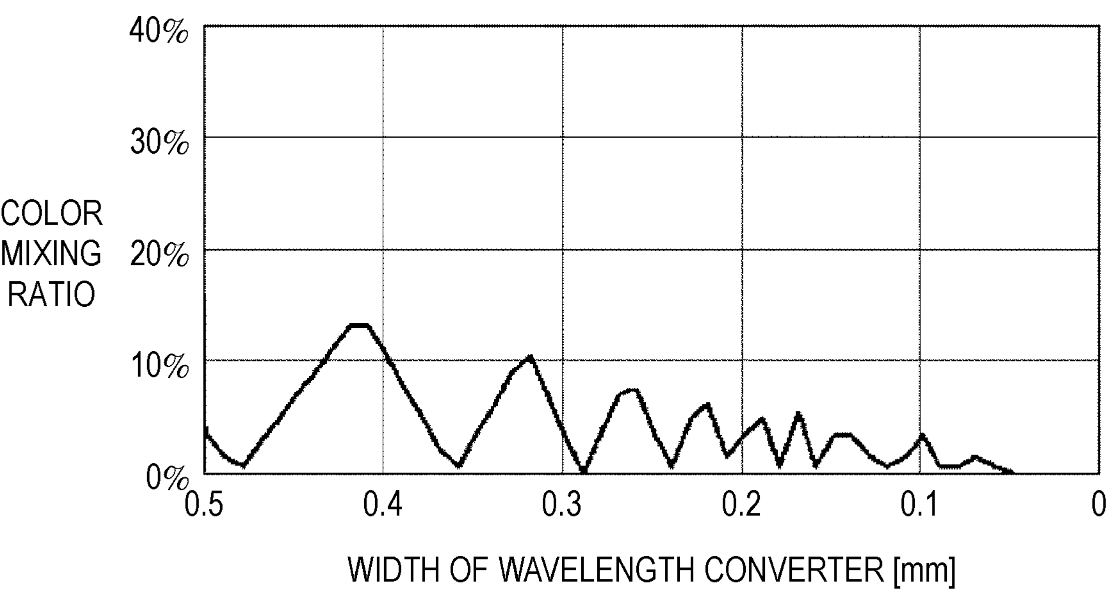
FIG. 9 is a graph illustrating a relationship between a width of a wavelength conversion element and a maximum color mixing ratio.

For example, as illustrated in FIG. 9, in the first exemplary embodiment, when width Ws of a spot size of first light Lg1 is 3 mm and width W of wavelength converters 13 is less than or equal to 0.5 mm, the color mixing ratio is less than or equal to 15%, and the maximum color mixing ratio is less than or equal to 10% in most of the widths.

Further, according to the method for manufacturing wavelength conversion device 3 of the first exemplary embodiment, it is possible to cope with production optimized corresponding to design conditions of wavelength conversion element 12, and it is possible to further reduce costs.

Second Exemplary Embodiment

Figure 10:
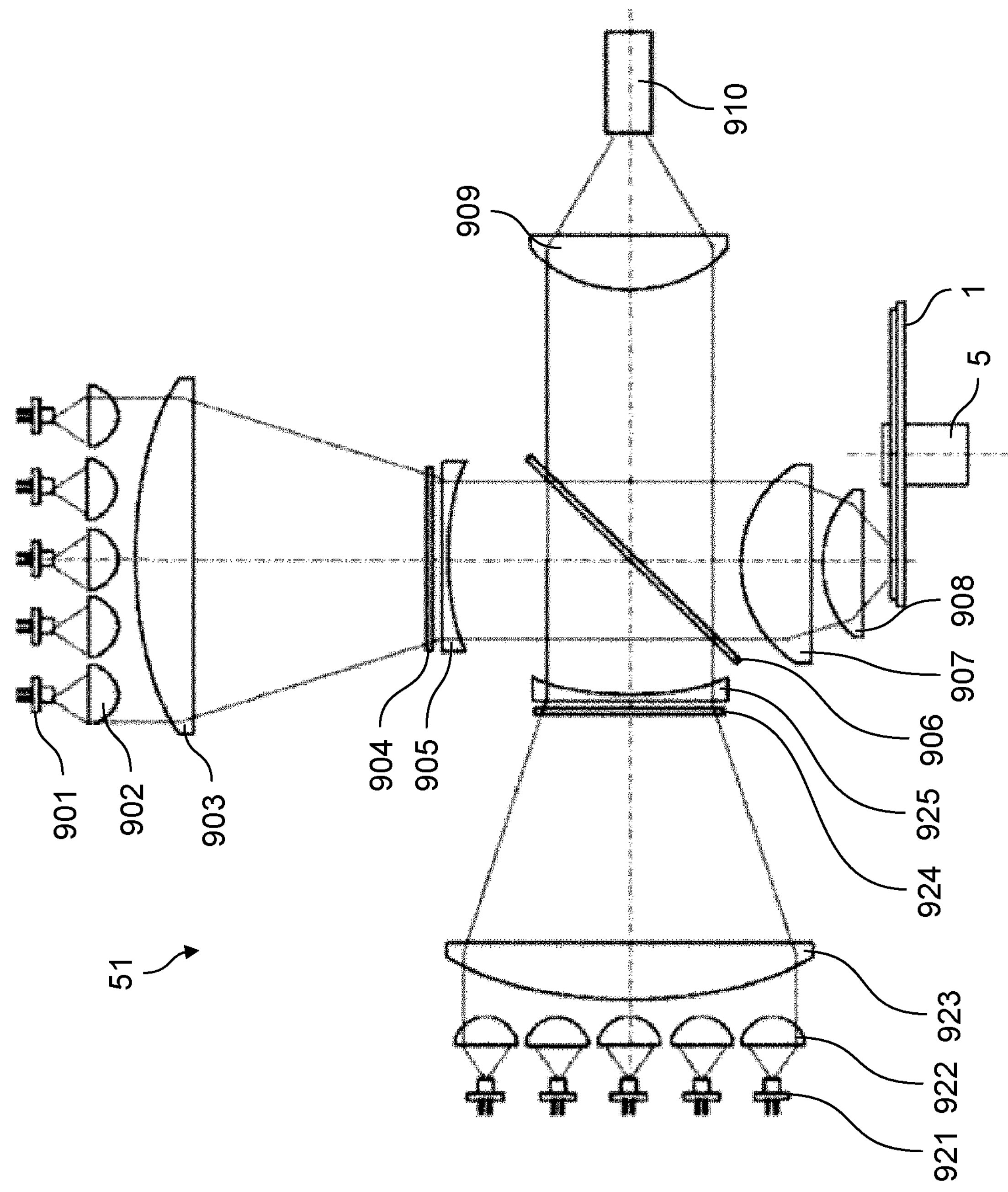
FIG. 10 is a diagram illustrating a configuration of a light source device according to a second exemplary embodiment.
Figure 11:
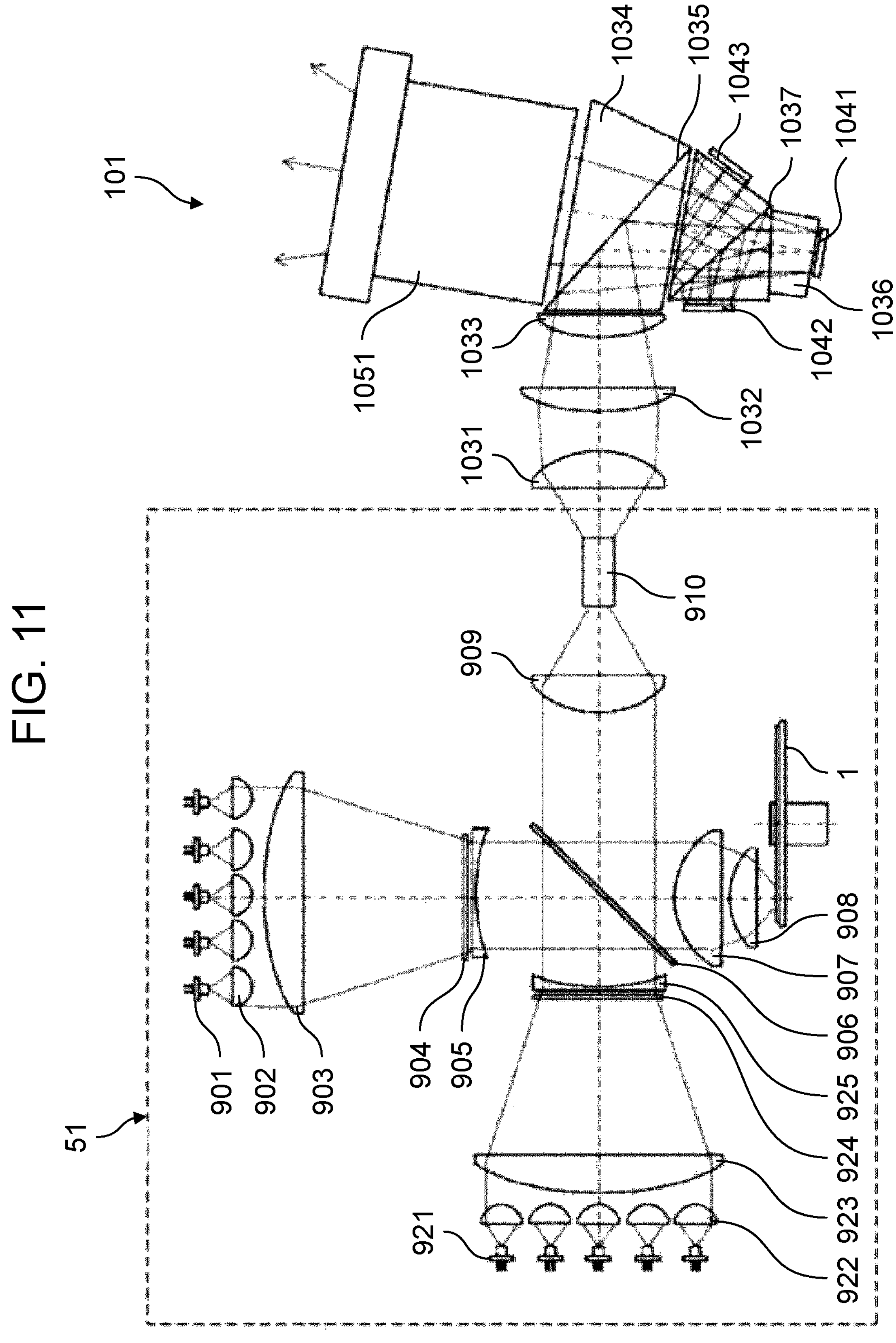
FIG. 11 is a diagram illustrating a configuration of a projection display apparatus according to the second exemplary embodiment.

Next, light source device 51 and projection display apparatus 101 according to the second exemplary embodiment will be described with reference to FIGS. 10 and 11. FIG. 10 is a diagram illustrating the configuration of the light source device according to the second exemplary embodiment. FIG. 11 is a diagram illustrating the configuration of the projection display apparatus according to the second exemplary embodiment.

As illustrated in FIGS. 10 and 11, the second exemplary embodiment is light source device 51 using phosphor wheel 1 of the first exemplary embodiment and projection display apparatus 101 using light source device 51. Phosphor wheel 1 according to the first exemplary embodiment and phosphor wheel 1 according to the second exemplary embodiment have the same configuration other than this matter and the matters described below, and thus, descriptions thereof are omitted.

FIG. 10 illustrates light source device 51 using phosphor wheel 1 including wavelength conversion device 3 that is annular. Light source device 51 of the second exemplary embodiment is, for example, a light source device for a three-chip method projection display apparatus. Note that, the three-chip method is an example of a projection display device using a current device, and the number of display elements may be other than three. Hereinafter, light source device 51 will be described with reference to phosphor wheel 1 with wavelength conversion element 12 illustrated in FIG. 2.

The laser light in a wavelength range of blue light emitted from a plurality of laser light sources 901 is collimated by a plurality of collimator lenses 902 corresponding to laser light sources 901. The collimated blue light is incident into convex lens 903 in a subsequent stage, decreases in a light flux width, then is incident onto diffuser plate 904 where the blue light is diffused and improved in light uniformity. The blue light with improved light uniformity is incident into concave lens 905 in the subsequent stage to be converted into parallel light flux.

The blue light collimated by concave lens 905 is incident on spectral characteristic mirror 906 inclined about 45 degrees with respect to an optical axis, and is incident into convex lens 907 in the subsequent stage without a change in a traveling direction of light. Spectral characteristic mirror 906 has spectral characteristics of transmitting the light in the wavelength range of blue light emitted from laser light sources 901 and laser light sources 921 and reflecting the light in the wavelength range of fluorescent light that is wavelength-converted by phosphor wheel 1 with the blue light from laser light sources 901 as excitation light.

In this case, although spectral characteristic mirror 906 has the spectral characteristic focusing on the wavelength characteristics of the blue light from the laser light sources and the fluorescent light that has been wavelength-converted, by paying attention to a polarization direction of the laser light sources, the polarization direction of the blue light from the laser light sources may be adjusted to the same direction such that spectral characteristic mirror 906 has spectral characteristics focusing on the wavelength characteristics of the fluorescent light that has been wavelength-converted through light with the wavelength range of the blue light in a specific polarization direction from the laser light sources.

The blue light incident into convex lens 907 then is incident by combination with convex lens 908 in the subsequent stage into wavelength conversion element 12 in a ring shape provided in phosphor wheel 1 in the subsequent stage. Motor 5 is attached to phosphor wheel 1, and phosphor wheel 1 is disposed such that blue excitation light condensed by convex lenses 907 and 908 is incident on wavelength conversion element 12 annularly disposed about a rotation shaft of phosphor wheel 1.

The blue light condensed by convex lenses 907 and 908 on wavelength conversion element 12 of phosphor wheel 1 is wavelength-converted into fluorescent light, changed in the traveling direction of light by 180 degrees, and incident again into convex lenses 908 and 907 in this order and turned into the collimated light. The wavelength region of the fluorescent light that is wavelength-converted here is optimized so as to constitute, for example, the white light in combination with the blue light emitted from laser light sources 921 to be described later.

The fluorescent light emitted from convex lens 907 and collimated is incident on spectral characteristic mirror 906 from an opposite direction. Spectral characteristic mirror 906 has a characteristic of reflecting the light in the wavelength region of fluorescent light as described above and thus changes the direction of light by 90 degrees. The fluorescent light having changed in the traveling direction of light by 90 degrees by spectral characteristic mirror 906 is incident into convex lens 909 in the subsequent stage.

Further, the laser light in the wavelength range of blue light emitted from the plurality of laser light sources 921 is collimated by a plurality of collimator lenses 922 corresponding to laser light sources 921. The collimated blue light is incident into convex lens 923 in the subsequent stage, decreases in the light flux width, then is incident onto diffuser plate 924 where the blue light is diffused and improved in light uniformity. The blue light with light uniformity improved is incident into concave lens 925 in the subsequent stage to be converted into the parallel light flux.

The blue light made parallel by concave lens 925 is incident on spectral characteristic mirror 906 that has a characteristic of transmitting the light in the wavelength range of blue light emitted from laser light sources 921 and is inclined about 45 degrees with respect to the optical axis, and is incident into convex lens 909 in the subsequent stage without a change in the traveling direction of light.

The fluorescent light incident from phosphor wheel 1 into convex lens 909 and the blue light from laser light sources 921 are condensed and incident into rod integrator 910 that has an entry end arranged around a light condensation position of convex lens 909. The light having light flux uniformized by rod integrator 910 is emitted from an exit end of rod integrator 910.

In the second exemplary embodiment shown in FIG. 10, spectral characteristic mirror 906 is disposed at an angle of approximately 45 degrees with respect to the optical axis. However, in order to maximize the spectral characteristics, an angle of the spectral characteristic mirror 906 with respect to the optical axis may have an angle different from approximately 45 degrees. In this case, other components may be disposed in accordance with the angle.

Further, spectral characteristic mirror 906 has been described as having characteristics of transmitting the light in the wavelength range of blue light and reflecting the light in the wavelength range of fluorescent light with reference to FIG. 10. However, spectral characteristic mirror 906 may have characteristics of reflecting the light in the wavelength range of blue light and transmitting the light in the wavelength range of fluorescent light, and an arrangement of other components may be optimized as appropriate.

Further, the laser light from laser light sources 901 may not be light in the wavelength range of blue light but may be light in an ultraviolet region. In that case, the characteristics of spectral characteristic mirror 906 and the arrangement of the other components may be optimized in accordance with the wavelength region of the laser light from laser light sources 901.

Next, a configuration of projection display apparatus 101 that has used light source device 51 using phosphor wheel 1 will be described. FIG. 11 illustrates a configuration of projection display apparatus 101 using light source device 51 as the first light source device. Projection display apparatus 101 according to the second exemplary embodiment is a so-called three-chip method projection display apparatus.

The light emitted from rod integrator 910 is mapped to digital micromirror devices (DMDs) 1041, 1042, and 1043 as the light modulator by a relay lens system configured of convex lenses 1031, 1032, and 1033.

The light emitted from the relay lens system configured of convex lenses 1031, 1032, and 1033 is incident into total reflection prism 1034 provided with minute gaps 1035. The light emitted from the relay lens system and incident into total reflection prism 1034 at an angle equal to or larger than a total reflection angle is reflected on minute gaps 1035, changed in the traveling direction of light, and incident into color prism 1036 configured of three glass blocks with minute gaps 1037.

Of the blue light and the fluorescent light incident from total reflection prism 1034 into a first glass block of color prism 1036, the blue light is first reflected on a spectral characteristic reflection film provided in front of minute gaps 1037 and having a characteristic of reflecting the blue light, then is changed in the traveling direction, travels to the total reflection prism, is incident into the minute gaps between total reflection prism 1034 and color prism 1036 at an angle equal to or larger than the total reflection angle, and is incident on DMD 1043 to display images of blue color.

Subsequently, the red light of the fluorescent light having transmitted through the minute gaps is reflected on a spectral characteristic reflection film that is provided between the second and third glass blocks of color prism 1036 and has spectral characteristics of reflecting light in the wavelength region of red color and transmitting the green light, and is changed in the traveling direction toward a first glass block side.

The red light whose traveling direction of light is changed is reflected again by minute gaps 1037 provided between the first and second glass blocks of color prism 1036, and the traveling direction of light is changed to be incident on DMD 1042 for red color.

Further, the green light of the fluorescent light having transmitted through the minute gaps transmits through a spectral characteristic reflection film that is provided between the second and third glass blocks of the color prism and has spectral characteristics of reflecting light in the wavelength region of red color and transmitting the green light, travels to the third glass block, and is incident on DMD 1041 for green color.

DMDs 1041, 1042, and 1043 change the traveling direction of light by changing a direction of mirror for each pixel in accordance with image signals of each color from an image circuit (not illustrated).

The green light having changed in the traveling direction of light in accordance with the image signals by DMD 1041 for green color is incident into the third glass block of color prism 1036, and transmits through the spectral characteristic reflection film provided between the third and second glass blocks of color prism 1036.

The red light having changed in the traveling direction of light in accordance with the image signals by red DMD 1042 is incident on the second glass block of color prism 1036, and is reflected by being incident on minute gaps 1037 provided between the second and first glass blocks of color prism 1036 at an angle equal to or larger than the total reflection angle. After that, the red light is changed in the traveling direction of light toward the third glass block of the color prism, reflected on the spectral characteristic reflection film provided between the second and third glass blocks of color prism 1036, changed in the traveling direction of light, and combined with the green light.

The light combined by the spectral characteristic reflection film travels to the first glass block side of color prism 1036, and is incident into minute gaps 1037 between the second and the first glass blocks of color prism 1036 at an angle less than or equal to the total reflection angle and transmitted.

Further, the blue light having changed in the traveling direction of light in accordance with the image signals in DMD 1043 for blue color is incident into the first glass block of color prism 1036, travels to total reflection prism 1034, and is incident into gaps between total reflection prism 1034 and color prism 1036 at an angle equal to or larger than the total reflection angle and travels toward a second glass block side of color prism 1036. After that, the blue light is reflected by the spectral characteristic reflection film provided on the first glass block side in front of minute gaps 1037 provided between the first and second glass blocks of color prism 1036, is changed in the traveling direction of light to total reflection prism 1034 side, is combined with the light from green DMD 1041 and red DMD 1042, and is incident into total reflection prism 1034.

The light from DMDs 1041, 1042, and 1043 incident into total reflection prism 1034 is transmitted through total reflection prism 1034, is incident into projection lens 1051 as the projection optical system, and is applied to a screen that is not illustrated.

In accordance with light source device 51 and projection display apparatus 101 in the second exemplary embodiment, since phosphor wheel 1 has been used, light with reduced color shift can be used as light of the light source.

Third Exemplary Embodiment

[3-1. Configuration of Wavelength Conversion Device]

Figure 12:
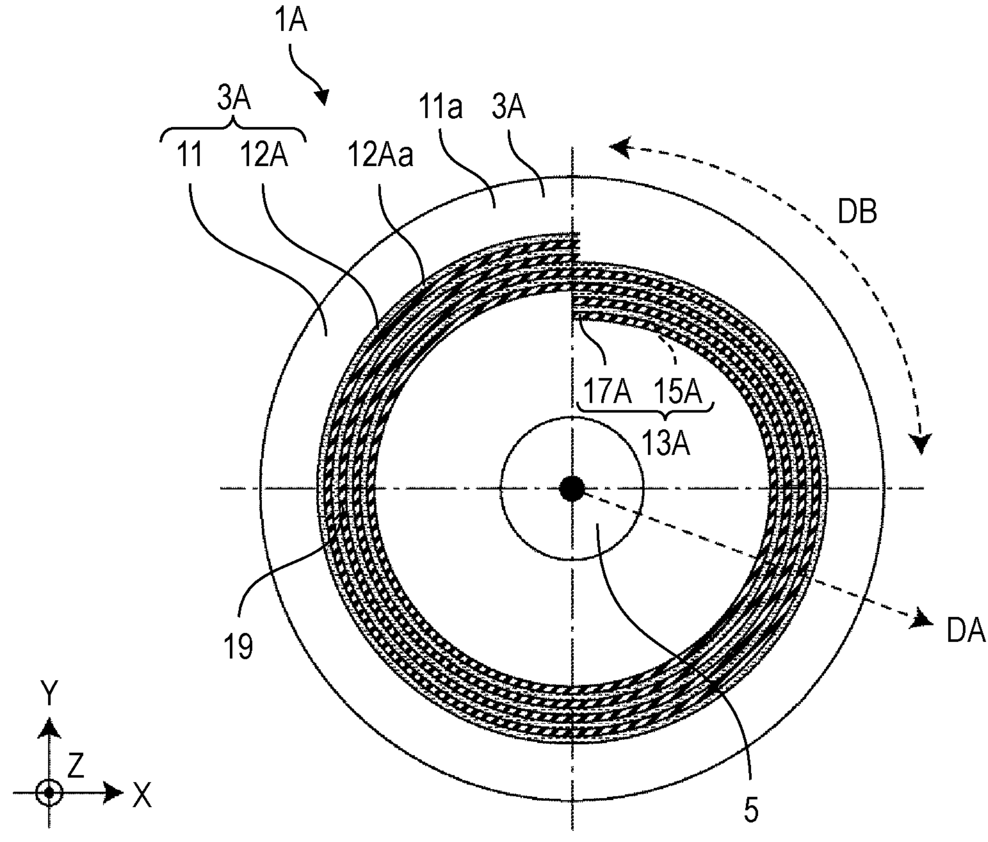
FIG. 12 is a diagram illustrating a configuration of a wavelength conversion device according to a third exemplary embodiment.
Figure 13:
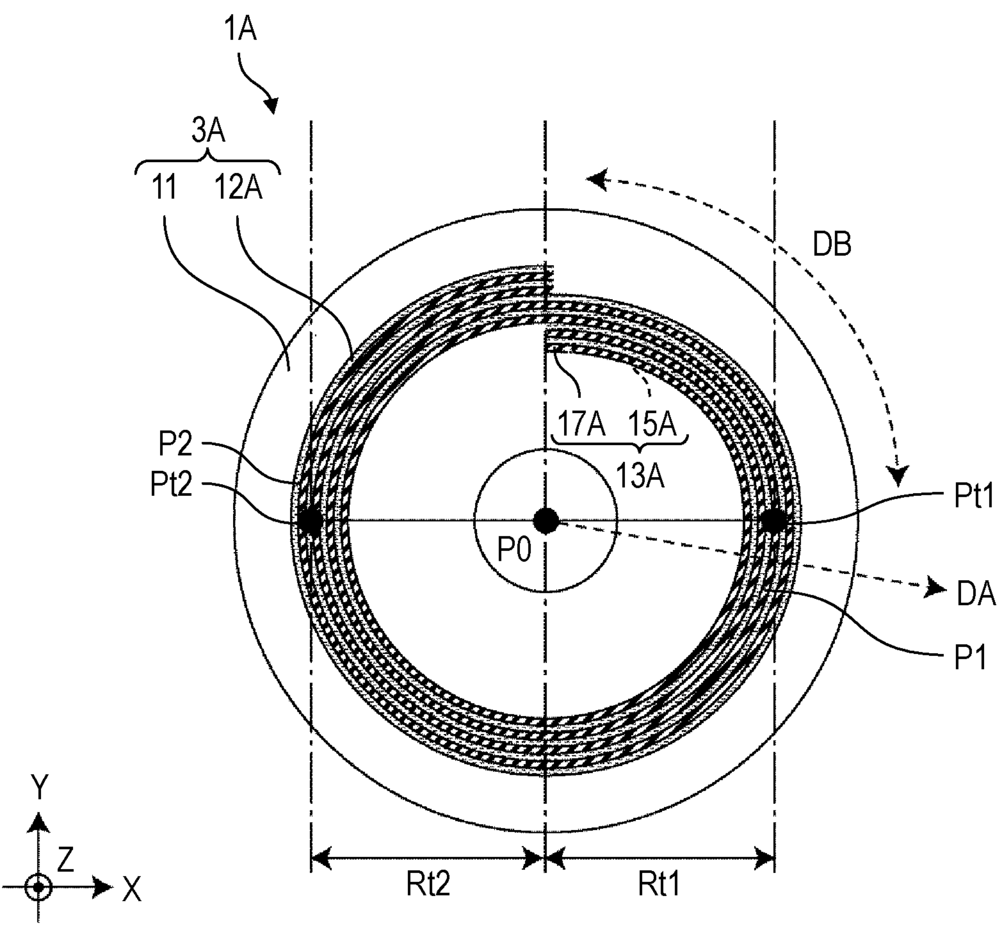
FIG. 13 is a diagram illustrating a positional relationship of a wavelength converter of a wavelength conversion device according to the third exemplary embodiment.

Next, phosphor wheel 1A of the third exemplary embodiment will be described with reference to FIGS. 12 and 13. FIGS. 12 and 13 are views illustrating a configuration of phosphor wheel 1A according to the third exemplary embodiment. Wavelength conversion element 12A of wavelength conversion device 3A of phosphor wheel 1A of the third exemplary embodiment has a spiral shape. Phosphor wheel 1 of the first exemplary embodiment and phosphor wheel 1A of the third exemplary embodiment have the same configuration except for this matter and the matters described below, and thus, descriptions thereof are omitted.

Wavelength conversion element 12A has the spiral shape, and a radius of each of first phosphor layer 15A and second phosphor layer 17A configuring wavelength converters 13A gradually increases from an inside to an outside of substrate 11.

As illustrated in FIG. 13, for example, a plurality of wavelength converters 13A are arranged at an arbitrary first position P1 in the circumferential direction of substrate 11 and an arbitrary second position P2 different from first position P1. Distance Rt1 between rotation center P0 of substrate 11 and first point Pt1 and distance Rt2 between rotation center P0 of substrate 11 and second point Pt2 are different between first point Pt1 that is a midpoint in radial direction DA of substrate 11 in the plurality of wavelength converters 13A arranged at first position P1 and second point Pt2 that is a midpoint in radial direction DA of substrate 11 in the plurality of wavelength converters 13A arranged at second position P2. In a case of such configuration, a radius of wavelength converters 13A increases as wavelength converters 13A extends in the circumferential direction of substrate 11, and wavelength converters 13A have the spiral shape. In other words, as shown in FIG. 13, the plurality of first phosphor layers 15A is configured into the spiral shape. Further, the plurality of second phosphor layers 17A is configured into the spiral shape.

[3-2. Method for Manufacturing Wavelength Conversion Device]

Figure 14:
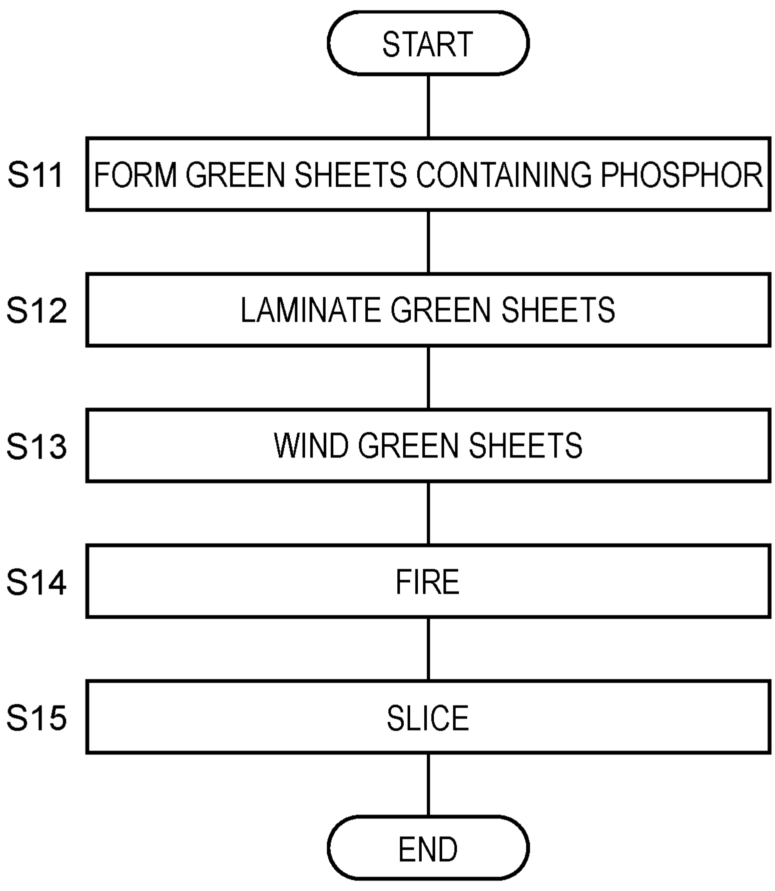
FIG. 14 is a flowchart illustrating a flow of manufacturing the wavelength conversion device according to the third exemplary embodiment.

Next, the method for manufacturing wavelength conversion device 3A will be described with reference to FIGS. 14 to 15E. FIG. 14 is a flowchart illustrating the flow of manufacturing wavelength conversion device 3A. FIGS. 15A to 15E are explanatory diagrams illustrating processes of manufacturing wavelength conversion device 3A according to the third exemplary embodiment.

Figure 15A:
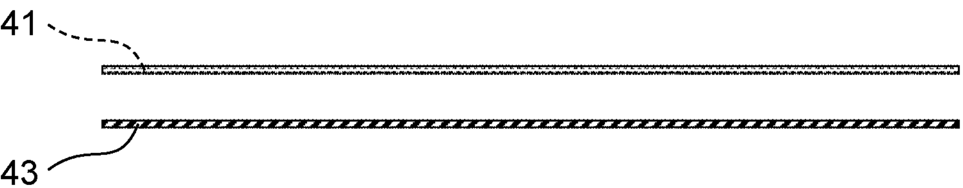
FIG. 15A is an explanatory view for explaining a process of manufacturing the wavelength conversion device according to the third exemplary embodiment.

In step S11, as shown in FIG. 15A, first green sheets 41 containing the first phosphor contained in first phosphor layer 15A and second green sheets 43 containing the second phosphor contained in second phosphor layer 17A are formed. FIG. 15A illustrates cross sections of first green sheets 41 and second green sheets 43. Here, first green sheets 41 are an example of the first sheet. Further, second green sheets 43 are an example of the second sheet.

First green sheets 41 and second green sheets 43 are formed, for example, by the following procedure. Ethanol, a PVB-based binder, and a glycerin-based plasticizer are added to a raw material powder obtained by blending predetermined amounts of each of a cerium oxide powder, a yttrium oxide powder, and an aluminum oxide powder, and pulverization and mixing are performed by a ball mill to form a slurry. From this slurry, first green sheets 41 and second green sheets 43 are formed by a doctor blade method.

Figure 15B:
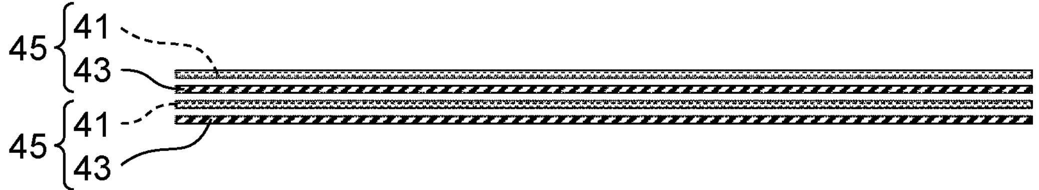
FIG. 15B is an explanatory view for explaining the process of manufacturing the wavelength conversion device according to the third exemplary embodiment.
Figure 15C:
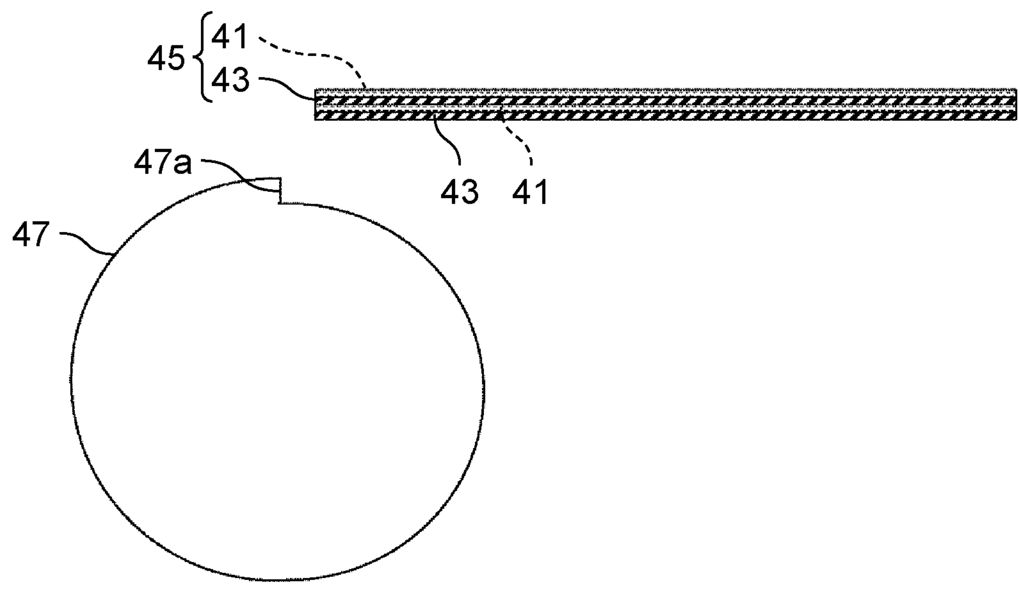
FIG. 15C is an explanatory view for explaining the process of manufacturing the wavelength conversion device according to the third exemplary embodiment.

In step S12, as shown in FIG. 15B, the first green sheets 41 and the second green sheets 43 are alternately laminated. First green sheets 41 and second green sheets 43 are used as a set of composite sheets 45 to form a plurality of laminated composite sheets 45. In FIG. 15B, two-layer composite sheets 45 are laminated.

Figure 15D:
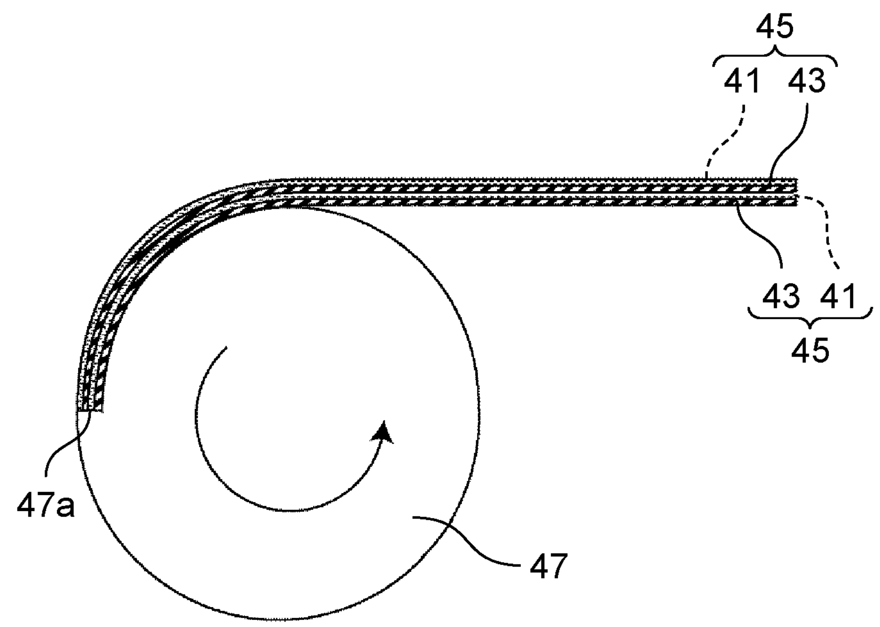
FIG. 15D is an explanatory view for explaining the process of manufacturing the wavelength conversion device according to the third exemplary embodiment.
Figure 15E:
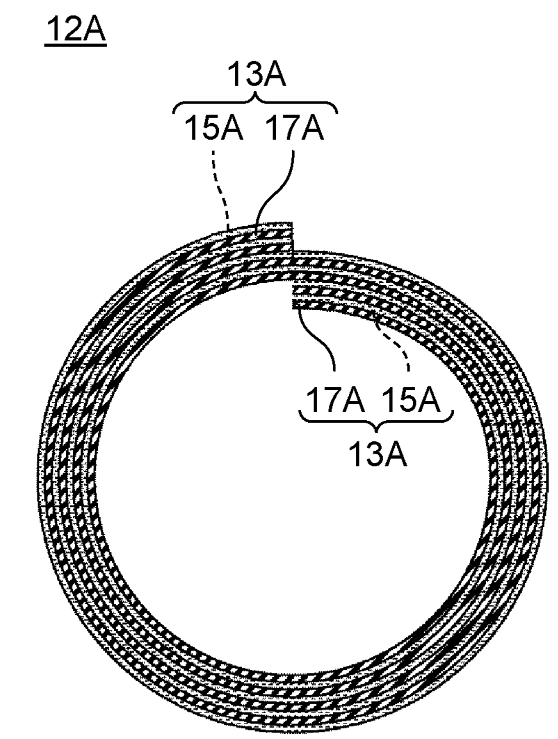
FIG. 15E is an explanatory view for explaining the process of manufacturing the wavelength conversion device according to the third exemplary embodiment.

In step S13, the laminated first green sheets 41 and second green sheets 43 are wound around tubular core member 47. Core member 47 has step 47*a* on an outer periphery thereof. Leading end portions of first green sheets 41 and second green sheets 43 laminated are brought into contact with step 47*a* of core member 47, and the leading end portion of the lowermost green sheet (second green sheet 43 in FIG. 15C) is bonded and fixed to core member 47. Next, as shown in FIG. 15D, core member 47 is rotated to wind the laminated first green sheets 41 and second green sheets 43 around the tubular core member 47. Core member 47 is rotated until the number of laminated composite sheets 45 reaches a desired number. In this case, in order to simplify the descriptions, the core member is rotated twice with respect to two-layer composite sheets 45 to form four-layer composite sheets 45 with the spiral shape.

Core member 47 is removed from a plurality of spiral composite sheets 45 in which the number of laminated composite sheets 45 is a desired number, and the plurality of spiral composite sheets 45 is fired in step S14. Accordingly, first green sheets 41 become first phosphor layer 15A, second green sheets 43 become second phosphor layer 17A, and composite sheets 45 become wavelength converters 13A.

In step S15, the plurality of fired spiral composite sheets 45 (wavelength converters 13A) are sliced into a desired thickness to form wavelength conversion element 12A. Formed wavelength conversion element 12A is bonded to wavelength conversion device 3A.

[3-3. Effects and the Like]

In this manner, according to the method for manufacturing the wavelength conversion device of the third exemplary embodiment, it is possible to efficiently manufacture a large amount of spiral wavelength conversion elements 12A and to reduce production costs. Further, in a case where the wavelength conversion device is manufactured from the green sheets, by increasing a filling amount of the phosphor, it is possible to obtain an improvement in wavelength conversion efficiency and a decrease in temperature of the phosphor due to a decrease in thermal resistance value.

Fourth Exemplary Embodiment

Figure 16:
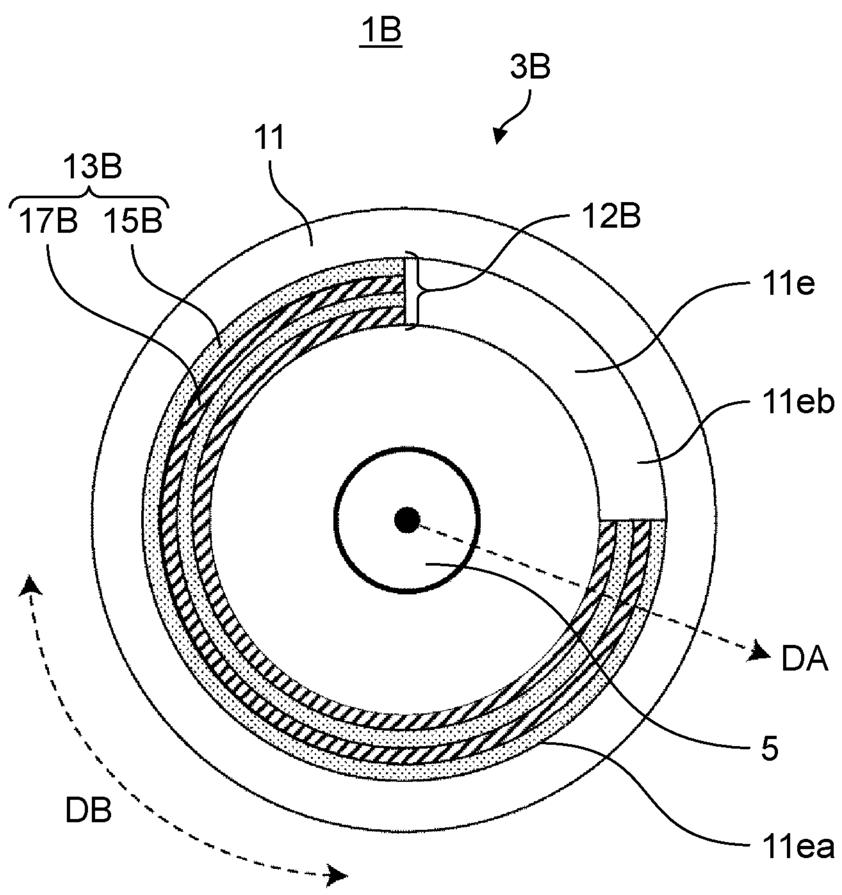
FIG. 16 is a diagram illustrating a configuration of a wavelength conversion device according to a fourth exemplary embodiment.
Figure 16:
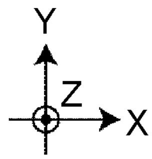
Figure 17:
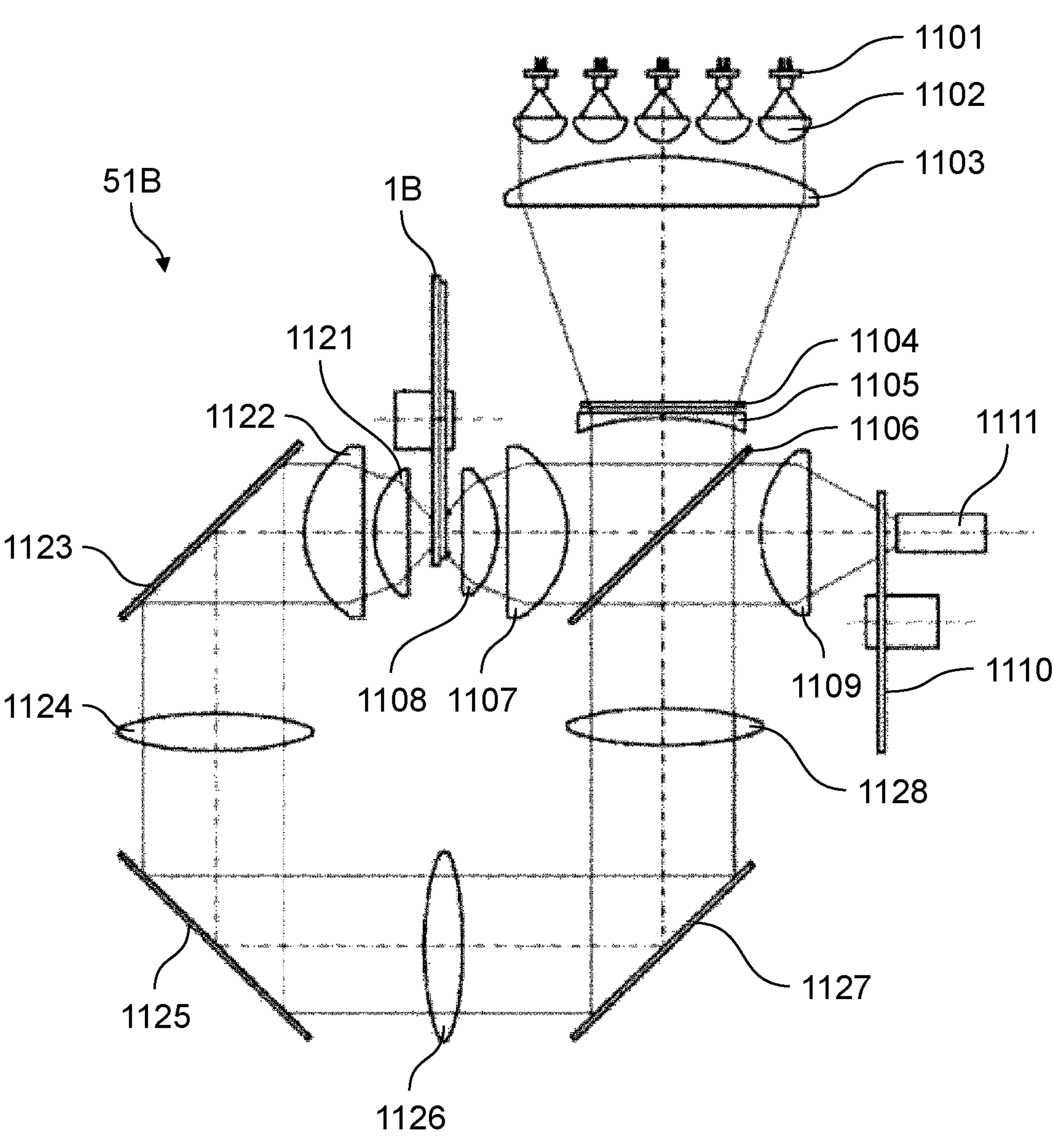
FIG. 17 is a diagram illustrating a configuration of a light source device according to the fourth exemplary embodiment.
Figure 18:
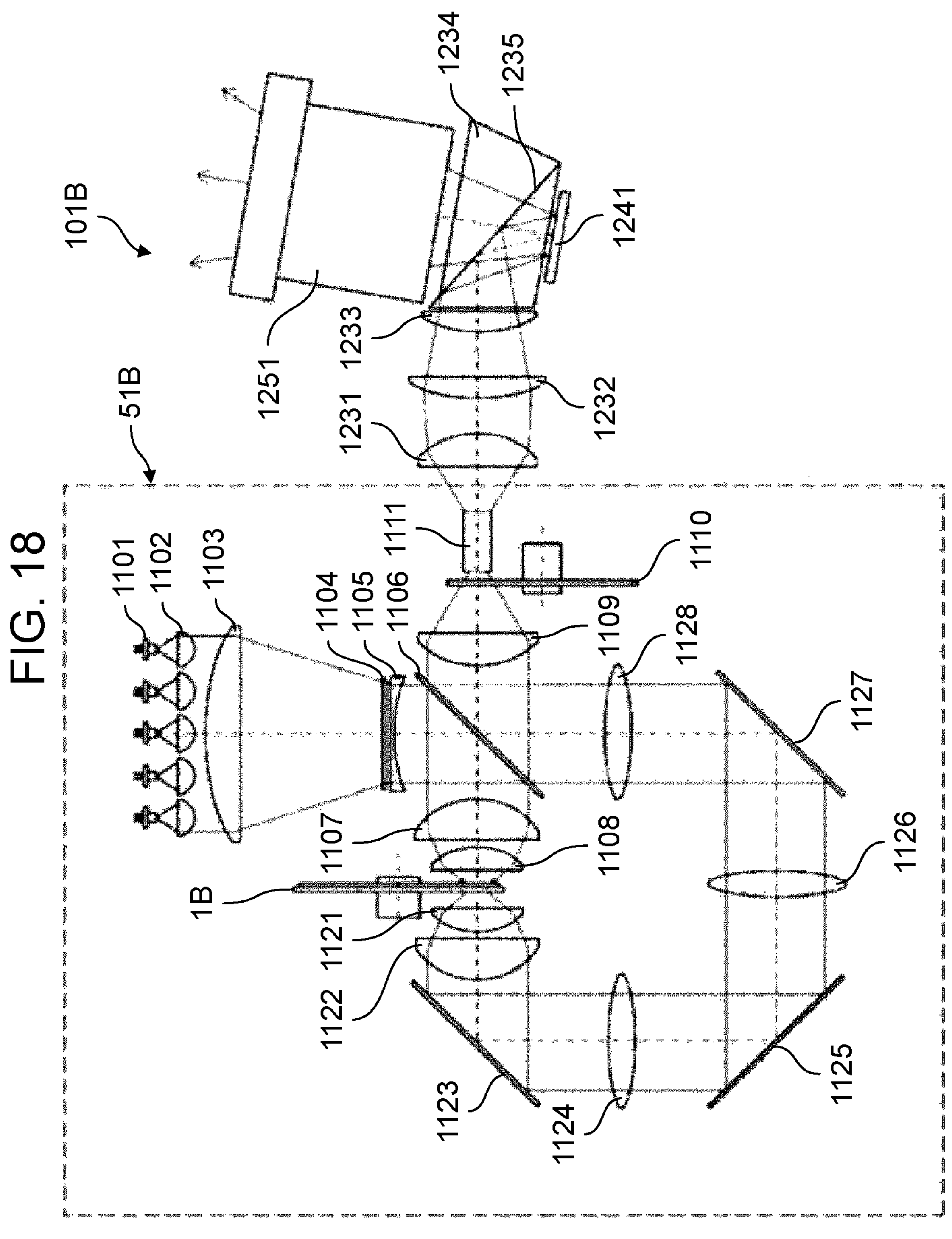
FIG. 18 is a diagram illustrating a configuration of a projection display apparatus according to the fourth exemplary embodiment.

Next, phosphor wheel 1B, light source device MB, and projection display apparatus 101B of the fourth exemplary embodiment will be described with reference to FIGS. 16 to 18. FIG. 16 is a diagram illustrating the configuration of phosphor wheel 1B according to the fourth exemplary embodiment. FIG. 17 is a diagram illustrating the configuration of light source device MB of the fourth exemplary embodiment. FIG. 18 is the diagram illustrating the configuration of projection display apparatus 101B according to the fourth exemplary embodiment.

As illustrated in FIG. 16, for example, phosphor wheel 1B of the fourth exemplary embodiment is a phosphor wheel for a one-chip method projection display apparatus. In phosphor wheel 1B, annular wavelength conversion element 12B is formed on annular region 11*e* of substrate 11, and opening 11*eb* through which first light Lg1 transmits is provided in a partial region of annular region 11*e*. In this manner, wavelength conversion device 3B of phosphor wheel 1B includes wavelength conversion element 12B having a segment shape. Wavelength conversion element 12B has segment-shaped first phosphor layer 15B and second phosphor layer 17B arranged side by side. Wavelength converters 13B are provided in partial region 11*ea* of annular region 11*e*, but since wavelength converters 13 are not formed in opening 11*eb* provided in a remaining region of annular region 11*e*, first light Lg1 can transmit through phosphor wheel 1B. In other words, as illustrated in FIG. 16, the plurality of first phosphor layers 15B, the plurality of second phosphor layers 17B, and opening 11*eb* are configured into the annular shape. Other configurations are the same as those of phosphor wheel 1 of the first exemplary embodiment, and thus descriptions thereof are omitted.

As illustrated in FIG. 17, light source device MB of the fourth exemplary embodiment is, for example, a light source device for a one-chip method projection display. Laser light in the wavelength range of blue light emitted from the plurality of laser light sources 1101 is collimated by a plurality of collimator lenses 1102 provided corresponding to laser light sources 1101. The collimated blue light is incident into convex lens 1103 in the subsequent stage, decreases in the light flux width, then is incident onto diffuser plate 1104 where the blue light is diffused and improved in light uniformity. The blue light with improved light uniformity is incident into concave lens 1105 in the subsequent stage and is turned into the parallel light flux.

The blue light made parallel by concave lens 1105 is incident on spectral characteristic mirror 1106 inclined about 45 degrees with respect to the optical axis, and is changed by 90 degrees in the traveling direction of light and incident into convex lens 1107 in the subsequent stage. Spectral characteristic mirror 1106 has spectral characteristics of reflecting the light in the wavelength range of blue light emitted from laser light sources 1101 and transmitting the light in the wavelength range of fluorescent light that is wavelength-converted by phosphor wheel 1B with the blue light from laser light sources 1101 as the excitation light.

Note that, in this case, although spectral characteristic mirror 1106 has the spectral characteristic focusing on the wavelength characteristics of the blue light from the laser light sources and the fluorescent light that has been wavelength-converted, by paying attention to the polarization direction of the laser light sources, the polarization direction of the blue light from the laser light sources may be adjusted to the same direction such that spectral characteristic mirror 1106 has spectral characteristics focusing on the wavelength characteristics of the fluorescent light that has been wavelength-converted through light with the wavelength range of the blue light in the polarization direction from the laser light sources.

The blue light incident into convex lens 1107 is then incident by combination with convex lens 1108 in the subsequent stage into wavelength conversion element 12B in the partially cut ring shape provided in phosphor wheel 1B in the subsequent stage. Phosphor wheel 1B is disposed such that the blue excitation light condensed by convex lenses 1107 and 1108 is incident on a radial region where annular wavelength conversion element 12B and opening 11*eb* are disposed about the rotation shaft.

The blue light condensed on wavelength conversion element 12B of phosphor wheel 1B by convex lenses 1107 and 1108 is wavelength-converted into the fluorescent light, and is incident into convex lenses 1108 and 1107 again in this order by changing the traveling direction of light by 180 degrees to be made parallel. In this case, the wavelength region of the fluorescent light that is wavelength-converted is optimized such that fluorescent light is combined with the blue light emitted from laser light sources 1101 to constitute the white light, for example.

The fluorescent light emitted from convex lens 1107 and made parallel is incident again into spectral characteristic mirror 1106. Spectral characteristic mirror 1106 has the characteristic of transmitting the light in the wavelength region of fluorescent light as described above and thus transmits the light without a change in the direction of light.

Next, the blue light from laser light sources 1101 condensed in opening 11*eb* of phosphor wheel 1B transmits through phosphor wheel 1B, and is made parallel by convex lenses 1121 and 1122 in the subsequent stage. After that, the light is guided by the relay lens system configured of three reflection mirrors 1123, 1125, and 1127 and three convex lenses 1124, 1126, and 1128 in the subsequent stage to spectral characteristic mirror 1106 in such a manner that the light is made parallel and incident on spectral characteristic mirror 1106 from a direction by 180 degrees opposite to the direction in which the light from laser light sources 1101 is incident. Note that, in this case, the relay optical system is configured of three mirrors and three convex lenses, but other configurations may be used as long as they have the same performance.

The blue light that is incident from convex lens 1128 into spectral characteristic mirror 1106 is reflected with a change in the traveling direction of light by 90 degrees.

According to the above configuration, the fluorescent light and the blue light combined by spectral characteristic mirror 1106 is time-divided and is incident into convex lens 1109.

The time-divided fluorescent light and blue light incident from spectral characteristic mirror 1106 into convex lens 1109 are condensed by convex lens 1109 in the subsequent stage and are incident into color filter wheel 1110 in the subsequent stage. Color filter wheel 1110 is synchronized with phosphor wheel 1B by a synchronization circuit not illustrated and is configured of a plurality of filters that has the characteristic of transmitting the blue light and part or all the wavelength ranges of the fluorescent light.

While yellow fluorescent light is emitted from phosphor wheel 1B, for example, color filter wheel 1110 rotates in synchronization, having at least one of a region in which light in the wavelength range of fluorescent light is directly transmitted, a region in which a red portion of fluorescent light is reflected and a green portion of fluorescent light is transmitted, and a region in which the green portion of fluorescent light is reflected and the red portion of fluorescent light is transmitted. Further, the blue light having transmitted through opening 11*eb* of phosphor wheel 1B is handled by the region in which the light in the wavelength range of fluorescent light is transmitted such that color light different in wavelength range of light is condensed in a time-series manner near the entry end of rod integrator 1111.

The light incident into rod integrator 1111 is uniformed by rod integrator 1111 and the uniformed light is emitted from the exit end thereof.

Note that, in the fourth exemplary embodiment, color filter wheel 1110 is disposed in front of rod integrator 1111, but it may be disposed behind rod integrator 1111.

As illustrated in FIG. 18, projection display apparatus 101B of the fourth exemplary embodiment is, for example, a one-chip method projection display apparatus. Projection display apparatus 101B includes light source device 51B.

The light emitted from rod integrator 1111 is mapped to DMD 1241 to be described later by a relay lens system configured of convex lenses 1231, 1232, and 1233.

The light that has transmitted through convex lenses 1231, 1232, and 1233 and has been incident into total reflection prism 1234 is incident into minute gaps 1235 of total reflection prism 1234 at an angle equal to or larger than the total reflection angle, and is reflected to change the traveling direction of light and is incident on DMD 1241.

DMD 1241 emits light with a change in the traveling direction of light by changing a direction of a minute mirror in accordance with a signal from a image circuit not illustrated in synchronization with color light emitted from a combination of phosphor wheel 1B and color filter wheel 1110.

The light changed in the traveling direction of light by DMD 1241 in accordance with the image signals is incident into total reflection prism 1234, is incident into minute gaps 1235 of total reflection prism 1234 at the angle less than or equal to the total reflection angle and transmitted as it is, is incident into projection lens 1251, and projected onto the screen that is not illustrated.

According to phosphor wheel 1B, light source device 51B, and projection display apparatus 101B of the fourth exemplary embodiment, it is possible to suppress the decrease in conversion efficiency in light conversion in wavelength conversion element 12B of wavelength conversion device 3B, and to reduce a change in the ratio of light irradiated to two types of wavelength conversion layers respectively converted into light of different wavelength regions due to the shift of the spot of the irradiated light. Accordingly, color reproducibility can be improved.

Fifth Exemplary Embodiment

Figure 19:
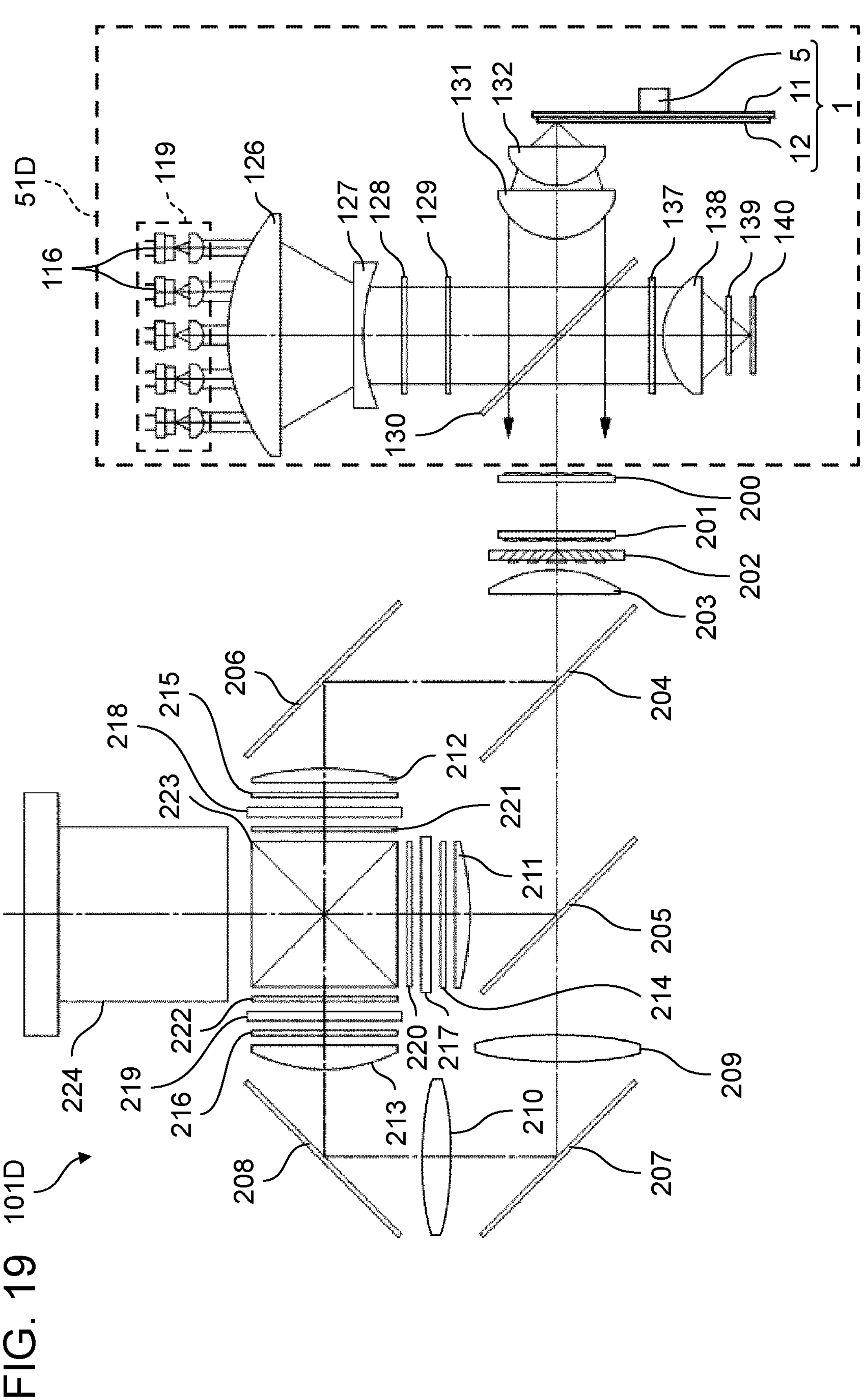
FIG. 19 is a diagram illustrating a configuration of a projection display apparatus according to a fifth exemplary embodiment.

Next, projection display apparatus 101D according to the fifth exemplary embodiment will be described with reference to FIG. 19. FIG. 19 is a diagram illustrating the configuration of projection display apparatus 101D according to the fifth exemplary embodiment.

Projection display apparatus 101D uses, as an image forming unit, an active matrix transmission liquid crystal panel in which a thin film transistor is formed in a pixel region in a TN (Twisted Nematic) mode or a VA (Vertical Alignment) mode.

Light source device 51D is configured of blue semiconductor laser 116, blue solid-state light source unit 119, lenses 126 and 127, first diffusion plate 128, first retarder 129, dichroic mirror 130, condenser lenses 131 and 132, fluorescent plate 136, ¼ wavelength plate 137 that is a second retarder, condenser lens 138, second diffusion plate 139, reflector 140, and phosphor wheel 1.

Light emitted from light source device 51D is incident on projection lens 224 via an optical system including first lens array plate 200, second lens array plate 201, polarization conversion element 202, superposing lens 203, green-reflecting dichroic mirror 204, blue-reflecting dichroic mirror 205, reflection mirrors 206, 207, and 208, relay lenses 209 and 210, field lenses 211, 212, and 213, incidence-side polarizing plates 214, 215, and 216, liquid crystal panels 217, 218, and 219, emission-side polarizing plates 220, 221, and 222, and color-combining prism 223 configured of a red-reflecting dichroic mirror and a blue-reflecting dichroic mirror.

The white light from light source device 51D is incident on first lens array plate 200 configured of a plurality of lens elements. The light flux incident on first lens array plate 200 is divided into a large number of light fluxes. The large number of divided light fluxes are converged on second lens array plate 201 configured of a plurality of lenses. The lens elements of first lens array plate 200 each have an opening shape similar to that of liquid crystal panels 217, 218, and 219. The lens elements of second lens array plate 201 each have a focal distance determined such that first lens array plate 200 and liquid crystal panels 217, 218, and 219 have a substantially conjugate relationship. Light emitted from second lens array plate 201 is incident into polarization conversion element 202.

Polarization conversion element 202 is configured of a polarized separation prism and a ½ wavelength plate, and converts natural light from a light source into light in one polarization direction. Since fluorescent light is natural light, the natural light is polarized and converted in one polarization direction, but since the blue light is incident as S-polarized light, the blue light is converted into P-polarized light. The light from polarization conversion element 202 is incident into superposing lens 203. Superposing lens 203 superposes the light emitted from each of the lens element of second lens array plate 201 on liquid crystal panels 217, 218, and 219 to illuminate. First lens array plate 200, second lens array plate 201, polarization conversion element 202, and superposing lens 203 are used as an illumination optical system.

The light from superposing lens 203 is separated into blue, green, and red color light by blue-reflecting dichroic mirror 204 and green-reflecting dichroic mirror 205 that serve as a color separation means. The green light is transmitted through field lens 211 and incidence-side polarizing plate 214, and then incident on liquid crystal panel 217. The blue light is reflected by reflection mirror 206, and then transmitted through field lens 212 and incidence-side polarizing plate 215, and incident on liquid crystal panel 218. After being transmitted through relay lenses 209 and 210 and being refracted by reflection mirrors 207 and 208, the red light is transmitted through field lens 213 and incidence-side polarizing plate 216, and then incident on liquid crystal panel 219.

Three liquid crystal panels 217, 218, and 219 change a polarization state of the incident light by controlling a voltage applied to pixels in accordance with the image signals, and modulate light in cooperation with incidence-side polarizing plates 214, 215, and 216 and emission-side polarizing plates 220, 221, and 222 that are arranged on both sides of liquid crystal panels 217, 218, and 219 such that transmission axes are orthogonal to each other, and thus, green, blue, and red images are formed. The color light transmitting through emission-side polarizing plates 220, 221, and 222 is incident into color-combining prism 223 where red and blue color light is reflected by the red reflecting dichroic mirror and the blue reflecting dichroic mirror, respectively, and combined with the green color light, and the resulting light is incident into projection lens 224. The light incident into projection lens 224 is enlarged and projected on the screen that is not illustrated.

According to projection display apparatus 101D of the fifth exemplary embodiment, it is possible to suppress the decrease in conversion efficiency in the light conversion in wavelength conversion element 12B of phosphor wheel 1 of light source device 51D, and to reduce a change in a ratio of light irradiated to two types of wavelength conversion layers respectively converted into light of different wavelength regions due to the shift of the spot of the irradiated light. Accordingly, the color reproducibility can be improved.

Other Exemplary Embodiments

As described above, the above exemplary embodiments have been described as examples of the techniques disclosed in the present application. However, the techniques in the present disclosure are not limited to the above exemplary embodiments, and can also be applied to exemplary embodiments in which change, substitution, addition, omission, and the like are performed. Further, the components described in the above exemplary embodiment may be combined to make a new exemplary embodiment.

Figure 20:
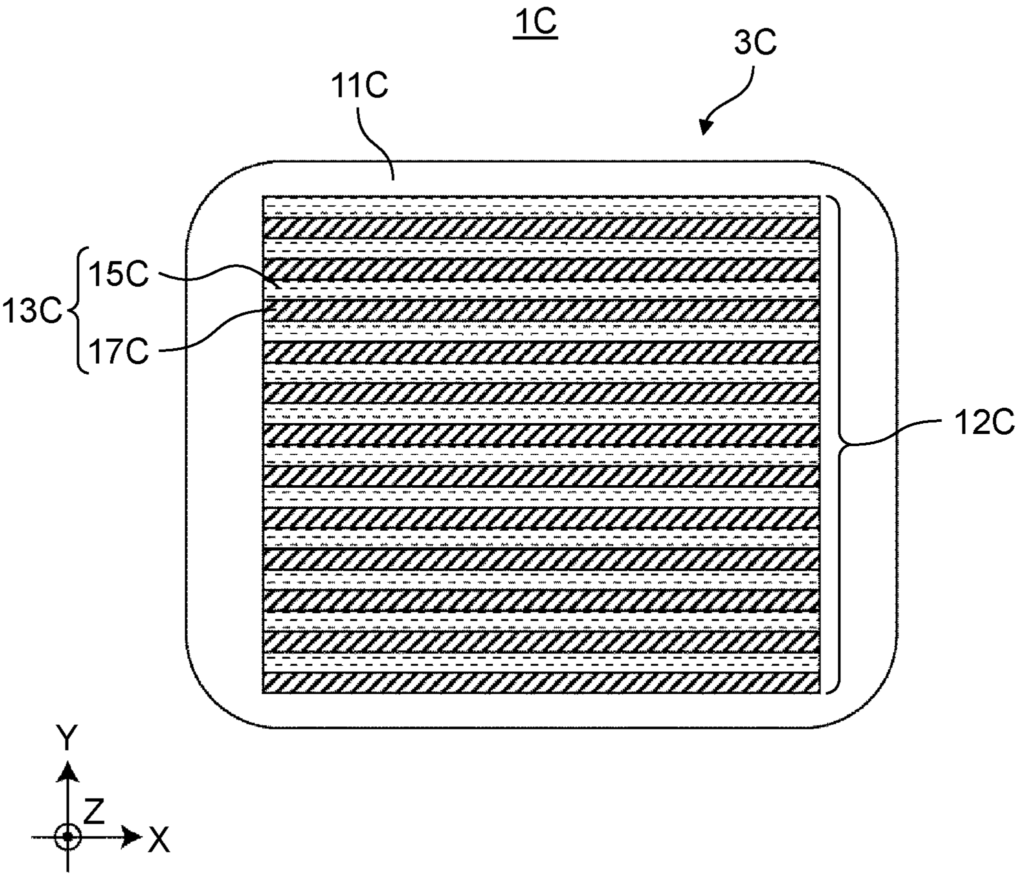
FIG. 20 is a diagram illustrating a configuration of a modification of the wavelength conversion device.

In the first exemplary embodiment, wavelength conversion device 3 is included in phosphor wheel 1, but the present disclosure is not limited thereto. As illustrated in FIG. 20, wavelength conversion device 3C may include rectangular substrate 11C instead of a disk-shaped substrate. Wavelength conversion element 12C having a linear shape extending along a longitudinal direction of substrate 11C is formed on rectangular substrate 11. Wavelength conversion element 12C includes the plurality of wavelength converters 13C, and each of the plurality of wavelength converters 13C includes linear first phosphor layer 15C and linear second phosphor layer 17C. In other words, as shown in FIG. 20, first phosphor layer 15C has the linear shape. Further, second phosphor layer 17C has the linear shape. Rectangular substrate 11 may receive first light Lg1 in a fixed state, or may receive first light Lg1 while reciprocating sliding in the longitudinal direction of wavelength conversion element 12C.

As described above, the exemplary embodiments have been described to exemplify the techniques in the present disclosure. Therefore, the accompanying drawings and the detailed descriptions have been presented. Thus, in order to exemplify the techniques described above, components illustrated or described in the accompanying drawings and the detailed descriptions may not only include components that are essential for solving the problems, but may also include components that are not essential for solving the problems. Thus, it should not be immediately construed that those non-essential components are essential only based on a fact that those non-essential components are illustrated or described in the accompanying drawings or the detailed descriptions.

Further, since the above exemplary embodiments are for illustrating the techniques in the present disclosure, various modifications, substitutions, additions, omissions, and the like can be made without departing from the scope of the accompanying claims or an equivalent scope thereof.

Overview of Exemplary Embodiments (1) A wavelength conversion device of the present disclosure includes a wavelength conversion element that generates, from first light incident on the wavelength conversion element, second light having a wavelength different from a wavelength of the first light, and third light having a wavelength different from the wavelength of the first light and the wavelength of the second light, in which the wavelength conversion element includes a plurality of wavelength converters arranged adjacent to each other in a first direction intersecting a direction in which the first light is incident, each of the plurality of wavelength converters includes a first phosphor layer that wavelength-converts the first light into the second light that is fluorescent light and a second phosphor layer that wavelength-converts the first light into the third light that is fluorescent light, and the first phosphor layer and the second phosphor layer are arranged adjacent to each other so as to be alternately arranged in the first direction.

Accordingly, it is possible to suppress a decrease in conversion efficiency and to reduce a change in a ratio of light irradiated to two types of wavelength conversion layers to be converted into light of different wavelength regions due to a shift of a spot of irradiated light.

(2) In the wavelength conversion device of (1), a width of the first phosphor layer in the first direction is greater than a height of the first phosphor layer in a direction in which the first light is incident, and a width of the second phosphor layer in the first direction is greater than a height of the second phosphor layer in the direction in which the first light is incident.

(3) The wavelength conversion device of (1) or (2) includes a substrate on which the wavelength conversion element is disposed, and the first direction is a direction along a surface of the substrate.

(4) In the wavelength conversion device of (3), the substrate has a disk shape, the plurality of wavelength converters are disposed adjacent to each other in a radial direction of the substrate, and the first phosphor layer and the second phosphor layer are disposed adjacent to each other so as to be alternately arranged in the radial direction of the substrate.

(5) In the wavelength conversion device according to any one of (1) to (4), a width of the first phosphor layer is equal to a width of the second phosphor layer.

(6) In the wavelength conversion device according to any one of (1) to (5), the wavelength conversion element includes 12 or more wavelength converters.

(7) In the wavelength conversion device of (3) or (4), the plurality of wavelength converters are disposed at an arbitrary first position in a circumferential direction of the substrate and an arbitrary second position different from the first position, and between a first point that is a midpoint in a radial direction of the substrate in the plurality of wavelength converters arranged at the first position and a second point that is a midpoint in the radial direction of the substrate in the plurality of wavelength converters at the second position, a distance between a rotation center of the substrate and the first point and a distance between the rotation center of the substrate and the second point are different.

(8) A phosphor wheel of the present disclosure includes the wavelength conversion device according to (3) or (4) and a motor that rotationally drives the substrate.

(9) A light source device of the present disclosure includes the phosphor wheel according to (8) and a light source that emits laser light as first light, in which a length in the radial direction of a spot of the first light incident on a wavelength conversion device from the light source is equal to an integral multiple of the length in the radial direction of wavelength converters.

(10) In the light source device according to (9), the light source emits blue laser light as the first light, and a first phosphor layer receives the first light and emits yellow light.

(11) In the light source device according to (9), the light source emits blue laser light as the first light, and the first phosphor layer receives the first light and emits red light.

(12) In the light source device according to any one of (9) to (12), the light source emits blue laser light as the first light, and the second phosphor layer receives the first light and emits green light.

(13) A projection display apparatus according to the present disclosure includes: one of the light source devices according to any one of (9) to (12); a light modulator that generates image light by using the second light and the third light emitted from the light source device; and a projection optical system that projects the image light.

(14) A method for manufacturing a wavelength conversion device according to the present disclosure includes: applying a first resin body including a first phosphor that performs wavelength conversion into fluorescent light of second light having a wavelength different from a wavelength of first light incident on a substrate onto the substrate at an interval on the substrate in a direction along a surface of the substrate; applying a second resin body including a second phosphor that performs wavelength conversion into fluorescent light of third light having a wavelength different from the wavelength of the first light and the wavelength of the second light onto the substrate adjacent to the first resin body in a direction along the surface of the substrate; forming a plurality of wavelength converters including the first resin body and the second resin body; and firing the plurality of first resin bodies and the plurality of second resin bodies formed on the substrate.

(15) The method for manufacturing a wavelength conversion device according to the present disclosure includes: forming a first green sheet including a first phosphor that performs wavelength conversion into fluorescent light of the second light having a wavelength different from a wavelength of the first light incident on the substrate, and a second green sheet including a second phosphor that performs wavelength conversion into fluorescent light of third light having a wavelength different from the wavelength of the first light and the wavelength of the second light; alternately laminating the first green sheets and the second green sheets; winding the first green sheets and the second green sheets that are laminated; firing the first green sheets and the second green sheets that are wound; slicing the first green sheets and the second green sheets that are fired into a predetermined thickness to form a wavelength conversion element that is spiral; and fixing the wavelength conversion element to the substrate.

The present disclosure can be used for a wavelength conversion device that irradiates illumination light to wavelength-convert light, a phosphor wheel, a light source device that uses light that is wavelength-converted by the phosphor wheel, and a projection display apparatus.

What is claimed is:

1. A wavelength conversion device comprising:

a wavelength conversion element that generates, from first light incident on the wavelength conversion element, second light having a wavelength different from a wavelength of the first light and third light having a wavelength different from the wavelength of the first light and the wavelength of the second light; and a substrate on which the wavelength conversion element is disposed, wherein the wavelength conversion element includes a plurality of wavelength converters arranged adjacent to each other in a first direction intersecting an incident direction in which the first light is incident, each of the plurality of wavelength converters includes:

a first phosphor layer that converts the first light into fluorescent light that is the second light; and a second phosphor layer that converts the first light into fluorescent light that is the third light, the first phosphor layer and the second phosphor layer are arranged adjacent to each other such that the plurality of first phosphor layers and the plurality of second phosphor layers included in the plurality of wavelength converters are alternately arranged in the first direction, the first direction is a direction along a surface of the substrate, the plurality of wavelength converters are disposed at an arbitrary first position in a circumferential direction of the substrate and an arbitrary second position different from the first position, and between a first point that is a midpoint in a radial direction of the substrate in the plurality of wavelength converters arranged at the first position and a second point that is a midpoint in the radial direction of the substrate in the plurality of wavelength converters at the second position, a distance between a rotation center of the substrate and the first point and a distance between the rotation center of the substrate and the second point are different.

2. The wavelength conversion device according to claim 1, wherein a width of the first phosphor layer in the first direction is longer than a height of the first phosphor layer in the incident direction, and a width of the second phosphor layer in the first direction is longer than a height of the second phosphor layer in the incident direction.

3. The wavelength conversion device according to claim 1, wherein the substrate has a disk shape, the plurality of wavelength converters are disposed adjacent to each other in a radial direction of the substrate, and the first phosphor layers and the second phosphor layers are disposed adjacent to each other such that the plurality of first phosphor layers and the plurality of second phosphor layers are alternately arranged in the radial direction of the substrate.

4. The wavelength conversion device according to claim 3, wherein the substrate includes an opening, and the plurality of first phosphor layers, the plurality of second phosphor layers, and the opening are configured into an annular shape.

5. A phosphor wheel comprising:
the wavelength conversion device according to claim 3, and
a motor that rotationally drives the substrate.

6. A light source device comprising:
the phosphor wheel according to claim 5, and
a light source that emits laser light as the first light, wherein
a width of a spot of the first light incident on the wavelength conversion device from the light source in the radial direction is equal to an integral multiple of a width of each of the plurality of wavelength converters in the radial direction.

7. The light source device according to claim 6, wherein
the light source emits blue laser light as the first light, and
the first phosphor layer receives the first light and emits yellow light.

8. The light source device according to claim 6, wherein
the light source emits the blue laser light as the first light, and
the first phosphor layer receives the first light and emits red light.

9. The light source device according to claim 6, wherein
the light source emits the blue laser light as the first light, and
the second phosphor layers receive the first light and emits green light.

10. A projection display apparatus comprising:
the light source device according to claim 6;
a light modulator that generates image light by using the second light and the third light emitted from the light source device; and
a projection optical system that projects the image light.

11. The wavelength conversion device according to claim 1, wherein
a width of the first phosphor layer is equal to a width of the second phosphor layer.

12. The wavelength conversion device according to claim 1, wherein
the plurality of wavelength converters includes 12 or more wavelength converters.

13. The wavelength conversion device according to claim 1, wherein
the plurality of first phosphor layers form a spiral shape, and
the plurality of second phosphor layers form a spiral shape.

14. The wavelength conversion device according to claim 1, wherein
the first phosphor layer has a linear shape, and
the second phosphor layer has a linear shape.

15. A light source device comprising:
a phosphor wheel including a wavelength conversion device and a motor; and
a light source that emits laser light as a first light,
wherein the wavelength conversion device includes:
a wavelength conversion element that generates, from the first light incident on the wavelength conversion element, second light having a wavelength different from a wavelength of the first light and third light having a wavelength different from the wavelength of the first light and the wavelength of the second light; and
a substrate on which the wavelength conversion element is disposed,
wherein the motor rotationally drives the substrate,
wherein the wavelength conversion element includes a plurality of wavelength converters arranged adjacent to each other in a first direction intersecting an incident direction in which the first light is incident,
each of the plurality of wavelength converters includes:
a first phosphor layer that converts the first light into fluorescent light that is the second light; and
a second phosphor layer that converts the first light into fluorescent light that is the third light,
wherein the first phosphor layer and the second phosphor layer are arranged adjacent to each other such that the plurality of first phosphor layers and the plurality of second phosphor layers included in the plurality of wavelength converters are alternately arranged in the first direction,
the first direction is a direction along a surface of the substrate,
the substrate has a disk shape,
the plurality of wavelength converters are disposed adjacent to each other in a radial direction of the substrate,
the first phosphor layers and the second phosphor layers are disposed adjacent to each other such that the plurality of first phosphor layers and the plurality of second phosphor layers are alternately arranged in the radial direction of the substrate, and
a width of a spot of the first light incident on the wavelength conversion device from the light source in the radial direction is equal to an integral multiple of a width of each of the plurality of wavelength converters in the radial direction.

16. The light source device according to claim 15, wherein
the light source emits blue laser light as the first light, and
the first phosphor layer receives the first light and emits yellow light.

17. The light source device according to claim 15, wherein
the light source emits the blue laser light as the first light, and
the first phosphor layer receives the first light and emits red light.

18. The light source device according to claim 15, wherein
the light source emits the blue laser light as the first light, and
the second phosphor layers receive the first light and emits green light.

* * * * *